United States Patent
Kim et al.

(10) Patent No.: US 10,182,351 B2
(45) Date of Patent: Jan. 15, 2019

(54) METHOD FOR SERVICE SUBSCRIPTION RESOURCE-BASED AUTHENTICATION IN WIRELESS COMMUNICATION SYSTEM

(71) Applicant: LG ELECTRONICS INC., Seoul (KR)

(72) Inventors: Seongyun Kim, Seoul (KR); Hongbeom Ahn, Seoul (KR); Seungmyeong Jeong, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 275 days.

(21) Appl. No.: 15/037,999

(22) PCT Filed: Nov. 28, 2014

(86) PCT No.: PCT/KR2014/011556
§ 371 (c)(1),
(2) Date: May 19, 2016

(87) PCT Pub. No.: WO2015/080515
PCT Pub. Date: Jun. 4, 2015

(65) Prior Publication Data
US 2016/0302069 A1    Oct. 13, 2016

Related U.S. Application Data

(60) Provisional application No. 61/910,127, filed on Nov. 29, 2013, provisional application No. 61/914,395, (Continued)

(51) Int. Cl.
*H04L 29/06* (2006.01)
*H04W 12/08* (2009.01)
(Continued)

(52) U.S. Cl.
CPC .............. *H04W 12/08* (2013.01); *H04L 9/32* (2013.01); *H04L 63/101* (2013.01); *H04L 67/12* (2013.01); *H04W 4/70* (2018.02); *H04L 2209/80* (2013.01)

(58) Field of Classification Search
CPC ...................................................... H04L 67/12
See application file for complete search history.

(56) References Cited

U.S. PATENT DOCUMENTS

2002/0169986 A1* 11/2002 Lortz ...................... H04L 63/08
726/4
2007/0192276 A1* 8/2007 Lee .......................... G06F 21/10
(Continued)

FOREIGN PATENT DOCUMENTS

| KR | 10-2013-126444 | 11/2013 |
| WO | 2012/068465 A1 | 5/2012 |
| WO | 2013/085088 A1 | 6/2013 |

OTHER PUBLICATIONS

International Search Report and Written Opinion issued in International Application No. PCT/KR2014/011556, dated Mar. 18, 2015, 16 pages.
(Continued)

*Primary Examiner* — Thaddeus J Plecha
(74) *Attorney, Agent, or Firm* — Lee Hong Degerman Kang Waimey

(57) ABSTRACT

The present invention relates to a method for authorizing a specific operation of a specific resource in a wireless communication system, and comprises receiving, from a requesting M2M device, a request for a specific operation of a specific resource, the operation request including an identifier of the requesting M2M device and the identifier being associated with an M2M service subscription resource derived using a credential of the requesting M2M device; searching the M2M service subscription resource using the
(Continued)

identifier, and determining whether the requesting M2M device is authorized for a type of the specific resource using the M2M service subscription resource.

8 Claims, 19 Drawing Sheets

Related U.S. Application Data filed on Dec. 11, 2013, provisional application No. 61/928,001, filed on Jan. 16, 2014, provisional application No. 61/937,627, filed on Feb. 10, 2014, provisional application No. 61/940,505, filed on Feb. 17, 2014, provisional application No. 61/972,431, filed on Mar. 31, 2014, provisional application No. 62/030,621, filed on Jul. 30, 2014, provisional application No. 62/031,166, filed on Jul. 31, 2014.

(51) Int. Cl.
*H04L 29/08* (2006.01)
*H04L 9/32* (2006.01)
*H04W 4/70* (2018.01)

(56) References Cited

U.S. PATENT DOCUMENTS

| | | | | |
|---|---|---|---|---|
| 2012/0136749 A1* | 5/2012 | Hu | ............ | G06F 21/10 |
| | | | | 705/26.5 |
| 2014/0004895 A1* | 1/2014 | Song | ............ | H04W 4/70 |
| | | | | 455/509 |
| 2014/0208414 A1* | 7/2014 | Brandwine | ........ | G06F 21/6218 |
| | | | | 726/17 |
| 2014/0308917 A1* | 10/2014 | Lamberton | ............ | H04W 8/06 |
| | | | | 455/406 |
| 2014/0317707 A1* | 10/2014 | Kim | ............ | H04W 12/04 |
| | | | | 726/6 |

OTHER PUBLICATIONS

OneM2M Technical Specification, "OneM2M Functional Architecture," oneM2M-TS-0001, oneM2M Functional Architecture-V-0.2.1, Oct. 28, 2013, 108 pages.
ETSI Technical Specification, "Machine-to-Machine communications (M2M); Functional Architecture," ETSI TS 102 690 v2.1.1, Oct. 18, 2013, 333 pages.

\* cited by examiner

METHOD FOR SERVICE SUBSCRIPTION RESOURCE-BASED AUTHENTICATION IN WIRELESS COMMUNICATION SYSTEM

CROSS-REFERENCE TO RELATED APPLICATIONS

This application is the National Stage filing under 35 U.S.C. 371 of International Application No. PCT/KR2014/011556, filed on Nov. 28, 2014, which claims the benefit of U.S. Provisional Application Nos. 61/910,127, filed on Nov. 29, 2013, 61/914,395, filed on Dec. 11, 2013, 61/928,001, filed on Jan. 16, 2014, 61/937,627, filed Feb. 10, 2014, 61/940,505, filed on Feb. 17, 2014, 61/972,431, filed on Mar. 31, 2014, 62/030,621, filed on Jul. 30, 2014 and 62/031,166, filed on Jul. 31, 2014, the contents of which are all hereby incorporated by reference herein in their entirety.

TECHNICAL FIELD

The present invention relates to a method for service subscription resource-based authentication in a wireless communication system and an apparatus for the same.

BACKGROUND ART

M2M (Machine-to-Machine) communication technology has come into the spotlight with the advent of ubiquitous computing. M2M communication technology is being studied by many standards development organizations (SDOs) such as TIA, ATIS, ETSI and oneM2M. In M2M environments, communication between M2M related applications (network application/gateway application/device application) is performed and an M2M platform or framework (e.g. common service entity (CSE)) may differ from a network application operating entity.

An M2M platform or framework has capability for providing specific M2M services and such capability can be defined as resources associated therewith.

Only an authorized M2M entity can access the resources. Accordingly, an M2M entity (referred to as an access right M2M entity) that can control access rights with respect to the corresponding resources can allow a specific M2M entity to access the corresponding resources. However, since the access right M2M entity can provide privileges, which are not intended by an M2M service provider, to the specific M2M entity in present or future M2M service environments, a solution to this problem is needed.

Accordingly, the present invention proposes an improved access control method in an M2M system.

DISCLOSURE

Technical Problem

An object of the present invention devised to solve the problem lies in a procedure for authenticating a specific request in a wireless communication system.

The technical problems solved by the present invention are not limited to the above technical problems and those skilled in the art may understand other technical problems from the following description.

Technical Solution

In an aspect of the present invention, a method of authenticating, by an M2M device, a request for a specific operation of a specific resource in a wireless communication system includes: receiving, from a requesting M2M device, a request for a specific operation of a specific resource, the operation request including an identifier of the requesting M2M device, the identifier being associated with an M2M service subscription resource derived using a security association credentials of the requesting M2M device; searching the M2M service subscription resource using the identifier, and determining whether the requesting M2M device is authorized for a type of the specific resource using the M2M service subscription resource; determining whether the requesting M2M device is authorized for the specific operation of the specific resource, by using an access control policy resource for the specific resource, when the requesting M2M device is determined to be authorized for the type of the specific resource; and operating the specific resource when the requesting M2M device is determined to be authorized for the specific operation of the specific resource.

Additionally or alternatively, the method may further includes: identifying an M2M service subscription resource of the requesting M2M device using the security association credentials of the requesting M2M device; receiving a registration request from the requesting M2M device; allocating the identifier of the requesting M2M device when the registration request does not include the identifier of the requesting M2M device; and transmitting, to an M2M server, a request for including, in the identifier M2M service subscription resource, the identifier of the requesting M2M device, included in the registration request, or the allocated identifier of the requesting M2M device.

Additionally or alternatively, the determining of whether the requesting M2M device is authorized for the specific operation of the specific resource may include determining the requesting M2M device to be authorized for the type of the specific resource, when a plurality of M2M service subscription resources is searched and the requesting M2M device is determined to be authorized for the type of the specific resource using one of the plurality of M2M service subscription resources.

Additionally or alternatively, the access control policy resource for the specific resource may be indicated by a specific attribute of the specific resource.

Additionally or alternatively, the M2M service subscription resource may include IDs of service roles subscribed to the M2M service subscription resource and have a child resource storing identifiers of nodes or devices to which the M2M service subscription resource will be applied.

In another aspect of the present invention, an M2M device configured to authenticate a request for a specific operation of a specific resource in a wireless communication system includes: a radio frequency (RF) unit; and a processor configured to control the RF unit, wherein the processor is configured: to receive, from a requesting M2M device, a request for a specific operation of a specific resource, the operation request including an identifier of the requesting M2M device, the identifier being associated with an M2M service subscription resource derived using a security association credentials of the requesting M2M device; to search the M2M service subscription resource using the identifier and determine whether the requesting M2M device is authorized for a type of the specific resource using the M2M service subscription resource; to determine whether the requesting M2M device is authorized for the specific operation of the specific resource, by using an access control policy resource for the specific resource, when the requesting M2M device is determined to be authorized for the type of the specific resource; and to operate the specific resource when the requesting M2M device is determined to be authorized for the specific operation of the specific resource.

Additionally or alternatively, the processor may be configured to identify an M2M service subscription resource of the requesting M2M device using the security association credentials of the requesting M2M device, to receive a registration request from the requesting M2M device, to allocate the identifier of the requesting M2M device when the registration request does not include the identifier of the requesting M2M device and to transmit, to an M2M server, a request for including, in the identifier M2M service subscription resource, the identifier of the requesting M2M device, included in the registration request, or the allocated identifier of the requesting M2M device.

Additionally or alternatively, the processor may be configured to determine the requesting M2M device to be authorized for the type of the specific resource, when a plurality of M2M service subscription resources is searched and the requesting M2M device is determined to be authorized for the type of the specific resource using one of the plurality of M2M service subscription resources.

Additionally or alternatively, the access control policy resource for the specific resource may be indicated by a specific attribute of the specific resource.

Additionally or alternatively, the M2M service subscription resource may include IDs of service roles subscribed to the M2M service subscription resource and have a child resource storing identifiers of nodes or devices to which the M2M service subscription resource will be applied.

The aforementioned technical solutions are merely parts of embodiments of the present invention and various embodiments in which the technical features of the present invention are reflected can be derived and understood by a person skilled in the art on the basis of the following detailed description of the present invention.

Advantageous Effects

According to an embodiment of the present invention, it is possible to improve efficiency of authentication of a specific request in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
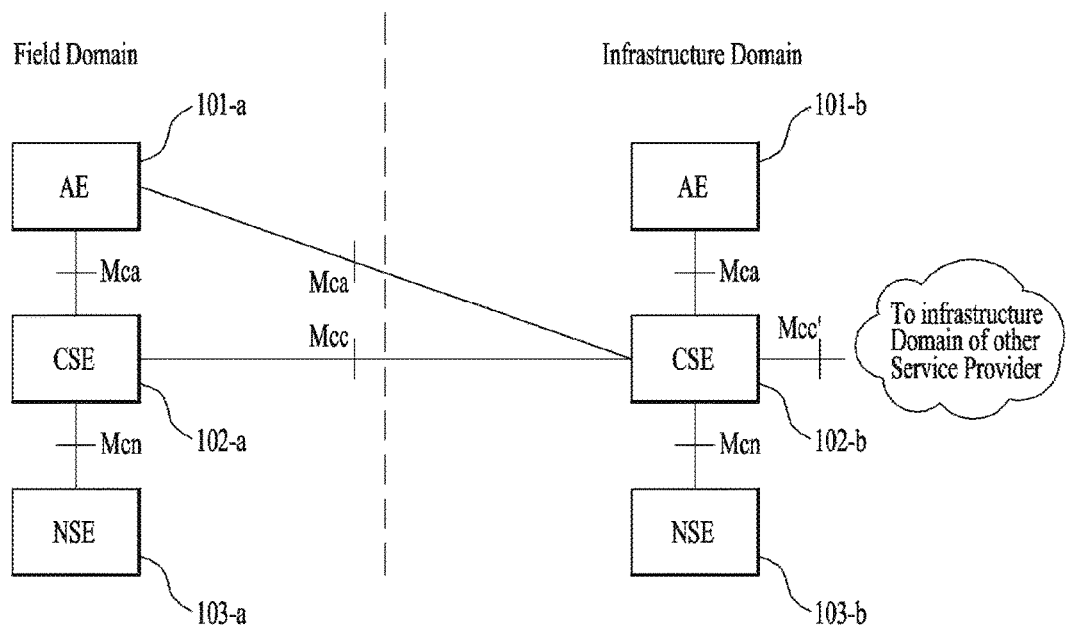
FIG. 1 illustrates a functional architecture of an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the one M2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
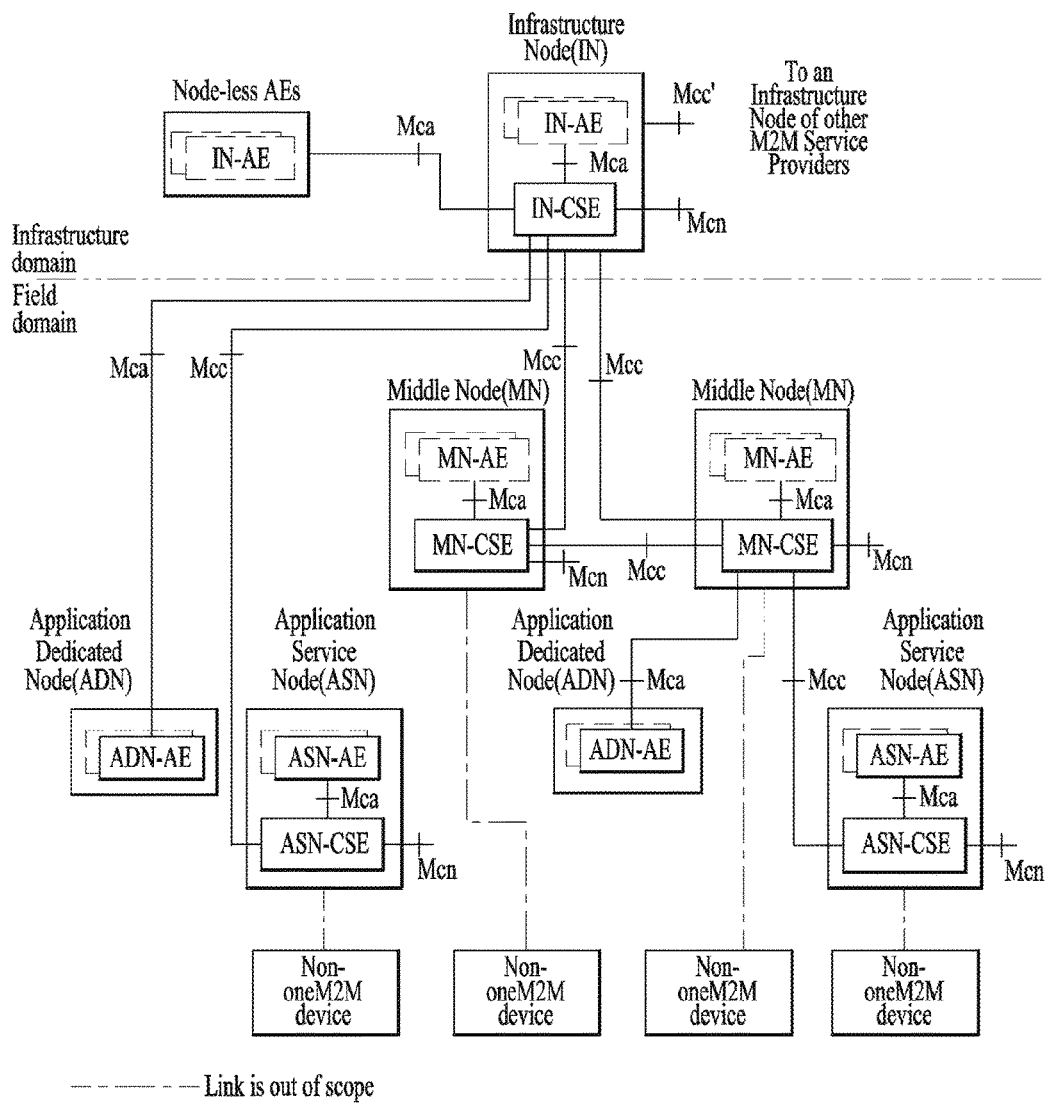
FIG. 2 illustrates an architecture supported by the M2M communication system on the basis of the M2M functional architecture.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN can be present in an M2M device.

Middle Node (MN): A middle node is a node that contains at least one CSE and may contain M2M applications. The middle node communicates over a Mcc references point with at least two nodes belonging to the following different category:

one or more ASNs;

one or more middle nodes (MNs); and one infrastructure structure.

The MN can be connected with the ADN through an Mca reference point. The MN can be present in an M2M gateway.

Infrastructure Node (IN): An infrastructure node is a node that contains one CSE and may contain application entities (AEs). The IN can be present in M2M server.

The IN communicates over a Mcc reference point with either:
one or more middle nodes; and/or
one or more application service nodes.

The IN may communicate with one or more ADNs over one or more Mca reference points.

Figure 3:
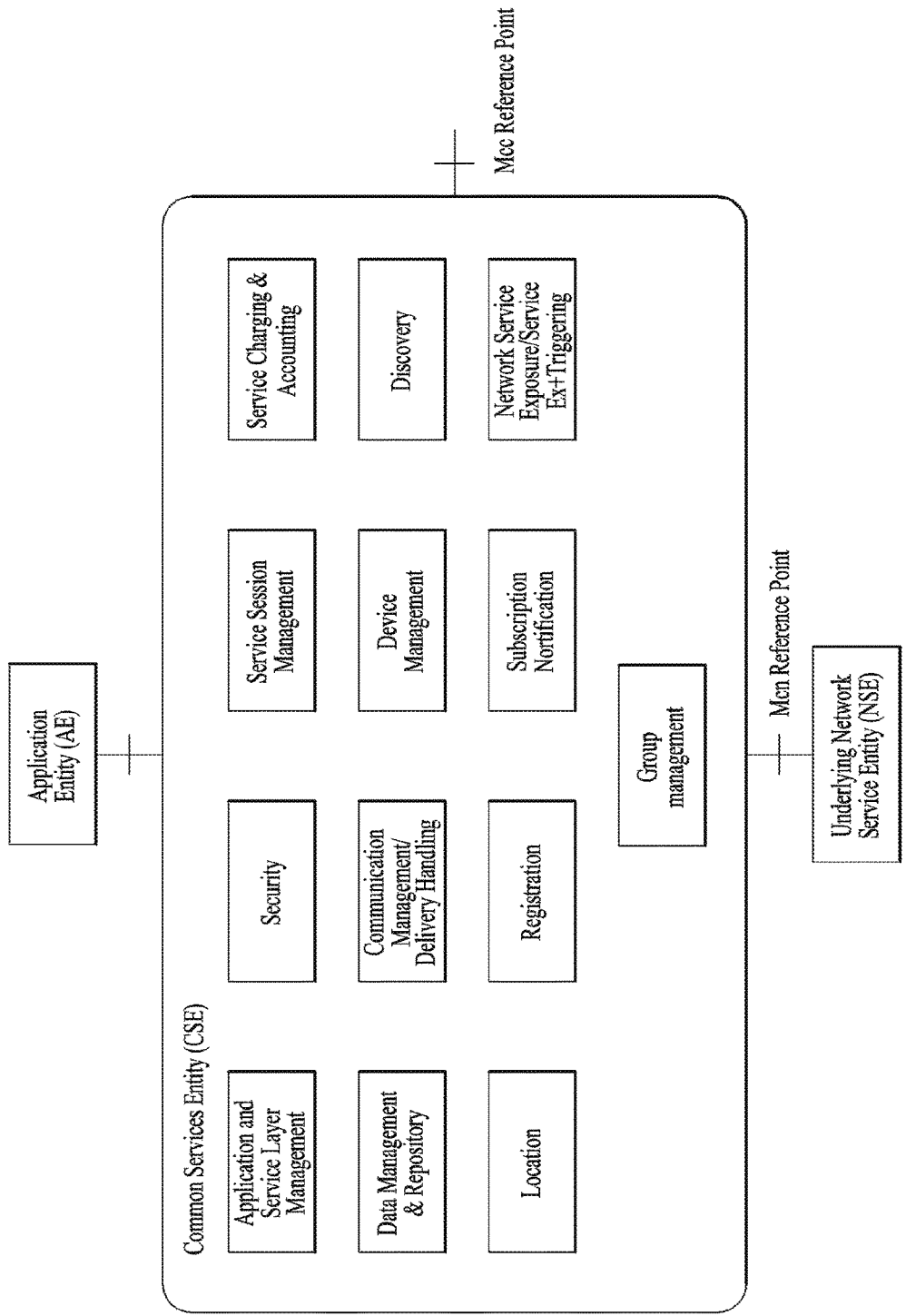
FIG. 3 illustrates a common service function provided by the M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE(or, M2M applications) may use through Mca reference point, or other CSE may use the M2M service functions through Mcc reference point. Also, the M2M service functions may be operated synchronized with underlying network(or underlying network service entity (NSE) such as 3GPP, 3GPP2, Wi-Fi, Bluetooth).

All one M2M devices/gateways/infrastructures do not have higher functions and may have mandatory functions and some optional functions from among the corresponding functions.

The term "resource" in the M2M communication system may be used to construct and express information in the M2M communication system, and may indicate all kinds of things capable of being identified by URI. The resource may be classified into a general resource, a virtual resource, and an announced resource. Respective resources can be defined as follows.

Virtual Resource: The virtual resource may trigger specific processing, and/or may perform retrieving of the result. The virtual resource is not permanently contained in CSE.

Announced Resource: The announced resource is a resource contained in the resource CSE connected to the announced (or notified) original resource. The announced resource may maintain some parts of the characteristics of the original resource. The resource announcement may facilitate the resource searching or discovery. The announced resource contained in the remote CSE is not present as a child of the original resource in the remote CSE, or may be used to generate child resources instead of the announced child of the original resource.

General resource: If this resource is not designated as the virtual or announced resource, the corresponding resource is a general resource.

Figure 4:
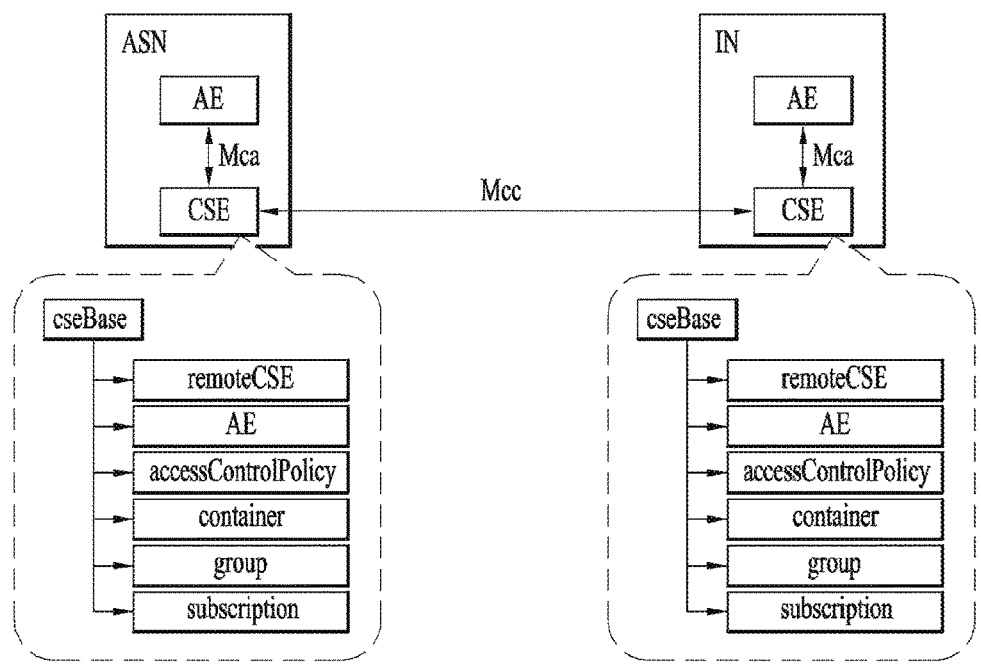
FIG. 4 illustrates resource structures present in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of one M2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
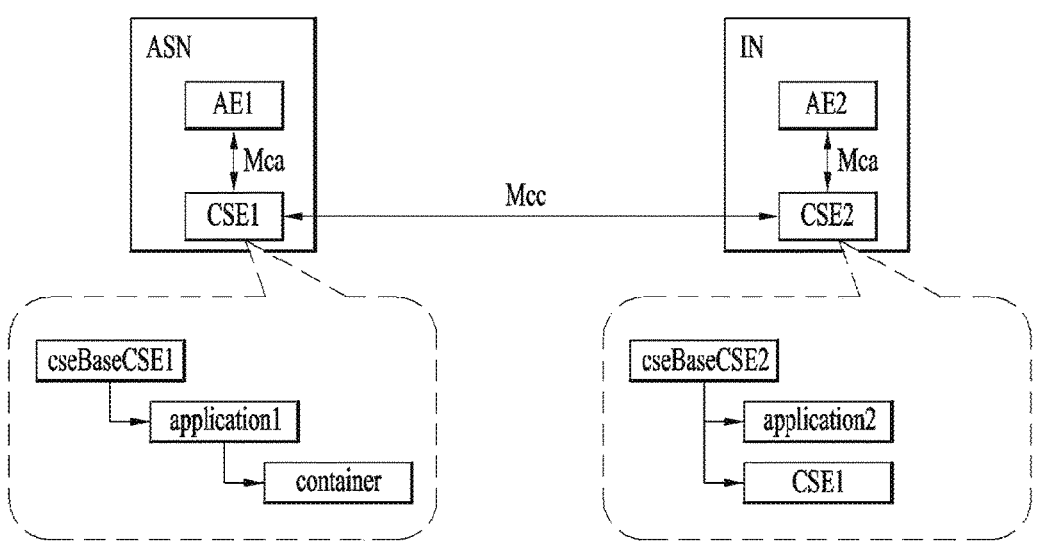
FIG. 5 illustrates resource structures present in an M2M application service node (e.g. M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE1 and CSE2 instead of directly communicating with application 2. To this end, CSE1 needs to be pre-registered with CSE 2. When CSE1 registers with CSE2, CSE1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

Meanwhile, various resource types shown in the following table are present.

TABLE 1

| Resource Type | Short Description | Child Resource Types | Parent ResourceTypes |
|---|---|---|---|
| CSEBase | The structural root for all the resources that are residing on a CSE. It shall store information about the CSE itself | remoteCSE, node, application, container, group, accessControlPolicy, subscription, mgmtObj, mgmtCmd, locationPolicy, statsConfig | None |
| group | Stores information about resources of the same type that need to be addressed as a Group. Operations addressed to a Group resource shall be executed in a bulk mode for all members belonging to the Group | fanOutPoint subscription | Application, remoteCSE, CSEBase |
| locationPolicy | Includes information to obtain and manage geographical location. It is only referred from container, the contentInstances of the container provides location information | subscription | CSEBase |
| remoteCSE | Represents a remote CSE for which there has been a registration procedure with the registrar CSE identified by the CSEBase resource | application, container, group, accessControlPolicy, subscription, mgmtObj, pollingChannel, node | CSEBase |

TABLE 1-continued

| Resource Type | Short Description | Child Resource Types | Parent ResourceTypes |
|---|---|---|---|
| subscription | Subscription resource represents the subscription information related to a resource. Such a resource shall be a child resource for the subscribe-to resource | schedule | accessControlPolicy, application, cmdhBuffer, cmdhDefaults, cmdhEcDefParamValues, cmdhDefEcValue, cmdhLimits, cmdhNetworkAccessRules, cmdhNwAccessRule, cmdhPolicy, container, CSEBase, delivery, eventConfig, execInstance, group, contentInstance, locationPolicy, mgmtCmd, mgmtObj, m2mServiceSubscription, node, nodeInfo, parameters, remoteCSE, request, schedule, statsCollect, statsConfig |
| container | Shares data instances among entities. Used as a mediator that takes care of buffering the data to exchange "data" between AEs and/or CSEs. | container, contentInstance, subscription, | application, container, remoteCSE, CSEBase |

Each resource type may be located below the parent resource type of the corresponding resource type, and may have a child resource type. In addition, each resource type may have attributes, and actual values may be stored in the attributes. Table 2 shows attributes of the <container> resource type. The attributes used to store the actual values may always be set to the value of 1 through multiplicity or may be selectively set to the values ('0 . . . 1') through multiplicity. In addition, the corresponding attributes may be established according to RO(Read Only), RW(Read and Write), WO(Write Only) according to characteristics generated when the corresponding attributes are generated.

TABLE 2

| Attribute Name of <container> | Multiplicity | RW/RO/WO | Description |
|---|---|---|---|
| resourceType | 1 | RO | Resource Type. This Write Once (at creation time then cannot be changed) resourceType attribute identifies the type of resources. Each resource shall have a resourceType attribute. |
| resourceID | 1 | WO | This attribute is an identifier for resource that is used for 'non-hierarchical URI method' or 'IDs based method' cases. This attribute shall be provided by the Hosting CSE when it accepts a resource creation procedure. The Hosting CSE shall assign a resourceID which is unique in the CSE. |
| parentID | 1 | RO | The system shall assign the value to this attribute according to the parameters given in the CREATE Request. It establishes the parent-child relationship by identification of the parent of this child resource. Such identifier shall use the non-hierarchical URI representation. For example, an AE resource with the identifier "myAE1" which has been created under the resource ". . . //example.com/oneM2M/myCSE", the value of the parentID attribute will contain " . . . //parentID". |
| expirationTime | 1 | RW | Time/date after which the resource will be deleted by the hosting CSE. This attribute can be provided by the Originator, and in such a case it will be regarded as a hint to the hosting CSE on the lifetime of the resource. The hosting CSE can however decide on the real expirationTime. If the hosting CSE decides to change the expirationTime attribute value, |

TABLE 2-continued

| Attribute Name of <container> | Multiplicity | RW/ RO/ WO | Description |
|---|---|---|---|
| | | | this is communicated back to the Originator. The lifetime of the resource can be extended by providing a new value for this attribute in an UPDATE operation. Or by deleting the attribute value, e.g. by not providing the attribute when doing a full UPDATE, in which case the hosting CSE can decide on a new value. This attribute shall be mandatory. If the Originator does not provide a value in the CREATE operation the system shall assign an appropriate value depending on its local policies and/or M2M service subscription agreements. |
| accessControlPolicyIDs | 0 . . . 1 (L) | RW | The attribute contains a list of identifiers (either an ID or a URI depending if it is a local resource or not) of an <accessControlPolicy> resource. The privileges defined in the <accessControlPolicy> resource that are referenced determine who is allowed to access the resource containing this attribute for a specific purpose (e.g. Retrieve, Update, Delete, etc.). If a resource type does not have an accessControlPolicyIDs attribute definition, then the accessControlPolicy for that resource is governed in a different way, for example, the accessControlPolicy associated with the parent may apply to a child resource that does not have an accessControlPolicyIDs attribute definition, or the privileges for access are fixed by the system. Refer to the corresponding resourceType and procedures to see how permissions are handled in such cases. If a resource type does have an accessControlPolicyIDs attribute definition, but the (optional) accessControlPolicyIDs attribute is not set, or it is set to a value that does not correspond to a valid, existing <accessControlPolicy> resource, or it refers to an <accessControlPolicy> resource that is not reachable (e.g. because it is located on a remote CSE that is offline or not reachable), then the system default access permissions shall apply. All resources are accessible only if the privileges from the Access Control Policy grants it, therefore all resources shall have an associated AccessControlPolicyIDs attribute, either explicitly (setting the attribute in the resource itself) or implicitly (either by using the parent privileges or the system defaults). Which means that the system shall provide a default access privileges in case that the Originator does not provide a specific Access ControlPolicyIDs during the creation of the resource, Default access grants the configures privileges to the originator (e.g. depending on the prefix of URI of the resource). This attribute is absent from the resource in some cases, especially if the resource shall have the same privileges of the parent resource; such an attribute is therefore not needed. To update this attribute, a Hosting CSE shall check whether an Originator has Update permission in any selfPrivileges of the <accessControlPolicy> resources which this attribute originally indicates. |

TABLE 2-continued

| Attribute Name of <container> | Multiplicity | RW/RO/WO | Description |
|---|---|---|---|
| labels | 0 . . . 1 | RO | Tokens used as keys for discovering resources.<br>This attribute is optional and if not present it means that the resource cannot be found by means of discovery procedure which uses labels as key parameter of the discovery. |
| creationTime | 1 | RW | Time/date of creation of the resource.<br>This attribute is mandatory for all resources and the value is assigned by the system at the time when the resource is locally created. Such an attribute cannot be changed. |
| creator | 1 | RW | The AE-ID or CSE-ID of the entity which created the resource. |
| lastModifiedTime | 1 | RO | Last modification time/date of the resource.<br>This attribute shall be mandatory and its value is assigned automatically by the system each time that the addressed target resource is modified by means of the UPDATE operation. |
| stateTag | 1 | RO | An incremental counter of modification on the resource. When a resource is created, this counter is set to 0, and it will be incremented on every modification of the resource.<br>NOTE: In order to enable detection of overflow, the counter needs to be capable of expressing sufficiently long numbers. .<br>NOTE: This attribute has the scope to allow identifying changes in resources within a time interval that is lower than the one supported by the attribute lastModifiedTime (e.g. less than a second or millisecond). This attribute can also be used to avoid race conditions in case of competing modifications. Modifications (e.g. update/delete) can be made on the condition that this attribute has a given value. |
| maxNrOfInstances | 0 . . . 1 | RW | Maximum number of instances of <instance> child resources. |
| maxByteSize | 0 . . . 1 | RW | Maximum number of bytes that are allocated for a <container> resource for all instances in the <container> resource. |
| maxInstanceAge | 0 . . . 1 | RW | Maximum age of the instances of <instance> resources within the <container>. The value is expressed in seconds. |
| currentNrOfInstances | 1 | RO | Current number of instances in a <container> resource. It is limited by the maxNrOfInstances. |
| currentByteSize | 1 | RO | Current size in bytes of data stored in a <container> resource. It is limited by the maxNrOfBytes. |
| latest | 0 . . . 1 | RO | Reference to latest instance, when present. |
| locationID | 0 . . . 1 | RW | URI of the resource where the attributes/policies that define how location information are obtained and managed. This attribute is defined only when the <container> resource is used for containing location information. |
| ontologyRef | 0 . . . 1 | RW | A reference (URI) of the ontology used to represent the information that is stored in the instances of the container.<br>NOTE: the access to this URI is out of scope of oneM2M |
| announceTo | 1 | RW | This attribute may be included in a CREATE or UPDATE Request in which case it contains a list of URIs/CSE-IDs which the resource being created/updated shall be announced to. This attribute shall only be present on the original resource if it has been successfully announced to other CSEs. This attribute maintains the list of URIs to the successfully announced resources. Updates on this attribute will trigger new resource announcement or de-announcement. |

As shown in FIG. 4 or 5, the resource for use in the M2M system may be represented by a tree structure, and the root resource type may be denoted by <CSEBase>. Therefore, the <CSEBase> resource type must be present only when the common service entity (CSE) is present.

Figure 6:
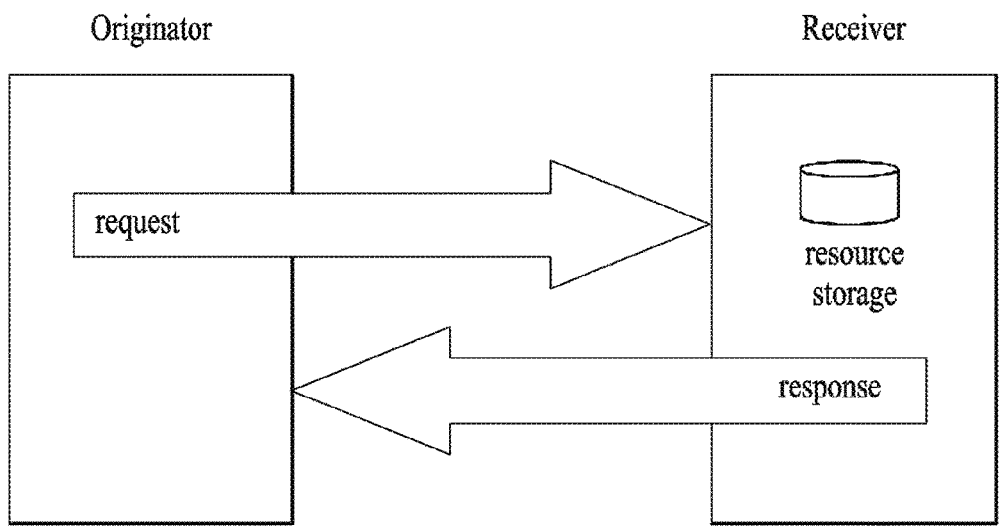
FIG. 6 illustrates a procedure for exchanging a request message and a response message used in an M2M communication system.

FIG. 6 is a conceptual diagram illustrating a general communication flow located at Mca and Mcc reference points. The M2M system operation is carried out on the basis of data exchanging. For example, in order to allow a first device to transmit or perform a command for stopping a specific operation of a second device, the first device must transmit the corresponding command (configured in a data form) to the second device. In the M2M system, data can be exchanged using the request and response messages during communication between the application (or CSE) and another CSE.

The request message may include the following information.

op: "op" means the shape of an operation to be carried out. (This information may be selected from among Create, Retrieve, Update, Delete, and Notify.)

to: "to" means an ID (i.e., ID of the receiver) of an entity scheduled to receive the request.

fr: "fr" means an ID of a calling user (i.e., call originator) who generates the request.

ri: "ri" means an ID (i.e., ID used to discriminate the request message) of the request message mi: "mi" means additional information (i.e., meta information) regarding the corresponding request.

cn: "cn" means content of resources to be transmitted.

The response message may include the following information. If the corresponding request message is successfully processed, the response message may include the following information.

to: "to" means an ID of a calling user (i.e., a call originator) who generates the request message.

fr: "fr" means an ID of a called person (i.e., a call receiver) who receives the request message.

ri: "ri" means an ID of the request message used to identify the ID of the request message.

mi: "mi" means additional information (i.e., meta information) regarding the corresponding request.

rs: "rs" means the processed result (for example, Okay, Okay and Done, Okay and in progress) of the request message.

ai: "ai" means additional information.

cn: "cn" means content of resources to be transmitted (only the resultant value (rs) can be transmitted.)

If the request message processing is failed, the response message may include the following information.

to: "to" means an ID of a calling user (i.e., a call originator) who generates the request message.

fr: "fr" means an ID of a called person (i.e., a call receiver) who receives the request message.

ri: "ri" means an ID of the request message (so as to identify the ID of the request message).

mi: "mi" means additional information (i.e., meta information) regarding the corresponding request.

rs: "rs" means the processed result (for example, Not Okay) of the request message.

ai: "ai" means additional information.

As described above, the response message may include the above-mentioned information.

Resource Access Control Policy

An access control policy is defined as a "white list" or privileges and each privilege defines "allowed" entities for certain access modes. Sets of privileges are handled such that the resulting privileges for a group of privileges are the sum of the individual privileges; i.e., an action is permitted if the action is permitted by some/any privilege in the set. A selfPrivilege attribute lists entities authorized for Read/Update/Delete of <accessControlPolicy> resource.

All privileges defined by the access control policy are associated with positions, time windows and IP addresses.

Privileges for accessing a resource are defined by privileges defined in <accessControlPolicy> resource by setting an accessControlPolicyID attribute on the resource.

Figure 7:
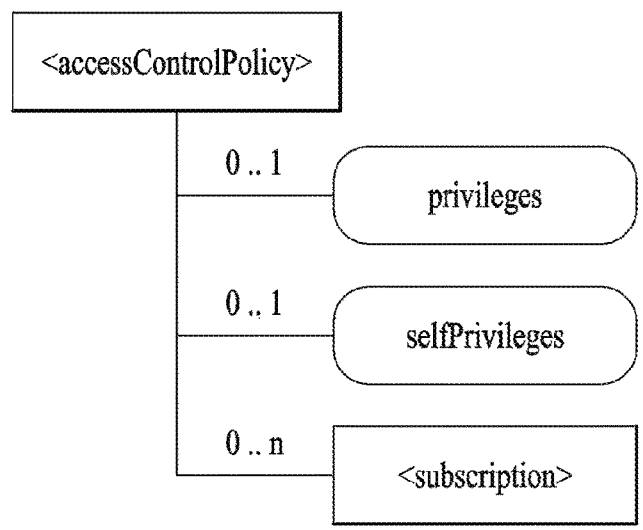
FIG. 7 illustrates a structure of an access control policy resource.

FIG. 7 illustrates a structure of the <accessControlPolicy> resource. The following table shows attributes of the <accessControlPolicy> resource.

TABLE 3

| Attribute Name of <accessControlPolicy> | Multiplicity | RW/ RO/ WO | Description |
|---|---|---|---|
| resourceType (rT) | 1 | RO | Refer to Table 2 |
| parentID (pID) | 1 | RO | Refer to Table 2 |
| expirationTime (eT) | 1 | RW | Refer to Table 2 |
| labels (lBs) | 0 . . . 1 | RW | Refer to Table 2 |
| creationTime (cT) | 1 | RO | Refer to Table 2 |
| lastModifiedTime (lMT) | 1 | RO | Refer to Table 2 |
| Link | 1 | WO | This attribute shall be present only on the announced resource. This attribute shall provide the link (URI) to the original resource. This is only for <accessControlPolicyAnnc>. |
| announceTo | 1 | RW | Refer to Table 2 |
| announcedAttribute | 1 | RW | This attributes shall only be present on the original resource if some Optional Announced (OA) type attributes have been announced to other CSEs. This attribute maintains the list of the announced Optional Attributes (OA type attributes) in the original resource. Updates to this attribute will trigger new attribute announcement if a new attribute is added or de-announcement if the existing attribute is removed. |

TABLE 3-continued

| Attribute Name of <accessControlPolicy> | Multiplicity | RW/ RO/ WO | Description |
|---|---|---|---|
| privileges (ps) | 1 | RW | The list of privileges defined by this <accessControlPolicy> resource. These privileges are applied to resources referencing this <accessControlPolicy> resource using the accessControlPolicyID attribute. |
| selfPrivileges (sP) | 1 | RW | Defines the list of privileges for the <accessControlPolicy> resource itself. |

Privileges can be generalized to actions (which may be granting access, but may also be more specific, granting access, i.e. filtering part of data). While the privileges can be generalized to conditions, which may include the identifier of a requestor, except specified identifiers, but the privileges may also include time based conditions.

An access authentication mechanism based on the access control policy operates by matching a requester to the privilege of the requester, stored in the <accessControlPolicy> resource. Upon discovery of positive matching, a requested operation (e.g. RETRIEVE) is checked using a set of allowed operations associated with a matching privilege owner. If the check fails, the request is rejected. Such set is referred to as a privilege flag.

Self-privileges and privileges are lists of requester privileges associated with the <accessControlPolicy> resource itself and privilege flags applied to the <accessControlPolicy> resource and all other resource types which address accessControlPolicyID common attribute.

All privileges defined in the access control policy are associated with positions, time windows and IP addresses prior to access authentication.

Each privilege of the self-privileges and privileges can be configured as a role. Such role is identified by a role name and a URL that addresses an M2M service subscription resource in which the role is defined. When a requester represents itself with a specific role, the access control policy operates by matching the requester with lists, which belong to a specific role specified in the M2M service subscription resource.

Each privilege in the privilege and self-privilege lists includes the following elements.

TABLE 4

| Name | Description |
|---|---|
| originatorPrivileges | Refer to Table 5 |
| Contexts | Refer to Table 6 |
| operationFlags | Refer to Table 7 |

"originatorPrivileges" includes information shown in the following table.

TABLE 5

| Name | Description |
|---|---|
| Domain | FQDN domain |
| Originator identifier | CSE ID or AE ID which represent a originator identity |
| Token | Access token usually provided as query parameter |
| All | All originators |
| Role | A role name associated with the URL the a Service Subscription resource where such role is defined |

"contexts" in Table 4 includes information shown in the following table.

TABLE 6

| Name | Description |
|---|---|
| Context | Defines the context in which every privileges of the present access control policy resource applies, e.g. time windows, location, and IP address. |

"operationFlags" in Table 4 includes information shown in the following table.

TABLE 7

| Name | Description |
|---|---|
| RETRIEVE | Privilege to retrieve the content of an addressed resource |
| CREATE | Privilege to create a child resource |
| UPDATE | Privilege to update the content of an addressed resource |
| DELETE | Privilege to delete an addressed resource |
| DISCOVER | Privilege to discover the resource |
| NOTIFY | Privilege to receive a notification |

In an M2M communication system, an access control policy resource is stored separately from a resource to which the corresponding access control policy has been applied. The resource to which the access control policy has been applied has only AccessRightID (URI of the access control policy resource) of the access control policy resource. Accordingly, if an M2M entity wants to check an access control policy of a specific resource, the M2M entity needs to refer to AccessRightID.

AE ID (Application Entity Identifier) and App-ID (Application Identifier)

An AE (Application Entity) ID can be defined with an App-ID included therein. An App-ID indicates an application type. For example, a messenger application A installed in cellular phone A and the same messenger application A installed in cellular phone 1 have the same App-ID.

An AE ID (e.g. 0x12345678) is composed of an App-ID (e.g. 0x1234) and a sequence number (e.g. 0x5678) set to uniquely allocate an AE ID per AE. This is exemplary. Alternatively, an AE ID may include an App-ID and a sequence number part may be present such that an AE ID is uniquely set per AE (URI is an example, and an App-ID can be present in a prefix part and a sequence number can be present in the remaining part in the form of App-ID/sequence number or App-ID_sequence number).

An AE ID can be determined when the corresponding AE is registered to a specific CSE. An AE registration request may be a request for the corresponding CSE to create a resource for the corresponding AE and an AE registration response may be a response to the request.

Therefore, the AE ID may not be preset in a service subscription resource that can be set through service agreement between a user or a subscriber and an M2M service provider. Furthermore, setting a service for a specific node per AE ID generates spatial overhead and transmission of the corresponding resource to another CSE causes network overhead. To solve this problem, the present invention proposes a method of storing services for a specific node in service subscription resources on the basis of App-IDs and AE attributes as well as AE IDs and an access control method using the same.

According to a conventional scheme, when a specific M2M entity (e.g. AE or CSE) is authorized to create a parent resource, the specific M2M entity is authorized to create resources of a child resource type belonging to the parent resource.

That is, when the specific M2M entity is authorized to create the parent resource (here, the rights may be stored in a specific resource as an attribute, and whether the specific M2M entity is authorized may be checked using rights related information through a link between the rights related information and the specific resource), the specific M2M entity is authorized to create resources of child resource type defined in parent resource type. For example, when <CSEBase> resource type is defined as shown in Table 1, if the specific M2M entity is authorized to create an instantiated CSEBase resource, the specific M2M entity is authorized to create resources conforming to child resource types (i.e. <group>, <locationPolicy>, <remoteCSE>, <subscription> and <container>) defined in the <CSEBase> resource type.

However, since the specific M2M entity is authorized to create all child resource types if the M2M entity is authorized to create the parent resource, as described above, it is impossible to perform detailed authorization. That is, a certain M2M entity is only authorized to create <mgmtCmd> and <mgmtObj> resource types for instantiated <CSEBase> resource, whereas another M2M entity is not authorized to create only <locationPolicy> and <container> resource types for the same <CSEBase> resource. Therefore, the present invention provides an access control method for determining whether an entity can create a child resource according to whether the entity is authorized to create a resource of a specific resource type.

In the following description, a subject entity refers to an AE or a CSE (framework or platform) which transmits a resource manipulation operation or operation request to a target entity. The target entity is an entity that the subject entity attempts to access or an entity (i.e. a resource hosting CSE, destination CSE, target CSE or a destination CSE of a request message) that provides a service to the subject entity and refers to a CSE. An entity refers to an AE or a CSE.

A device AE refers to an AE resident in a node to which an ASN-CSE belongs or an AE resident in an ADN. A gateway AE refers to an AE resident in a node to which an MN-CSE belongs. A server AE refers to an AE resident in a node belonging to an IN-CSE.

An AE present (installed) in a node to which the ASN-CSE belongs, an AE present (installed) in a node to which the MN-CSE belongs and an AE resident (installed) in the ADN refer to field domain AEs. A network (infrastructure) domain AE refers to an AE connected to an IN-CSE (CSE belonging to an M2M server) or an AE that is not installed in the ADN.

Device AEs, gateway AEs, server AEs, field domain AEs and network domain AEs can be identified by AE IDs thereof.

When the subject entity is a CSE, attributes of an operation request subject entity include the CSE ID and whether the CSE is an ASN-CSE, MN-CSE or IN-CSE. When the subject entity is an AE, the attributes include the application ID, AE ID (application instance ID), AE domain (which indicates whether the AE is present in a specific device and whether the AE corresponds to an infrastructure domain AE, a field domain AE, a gateway AE, a device AE or a service AE) and a role.

The reason why domains are classified is that an AE present in a network domain is expected to provide a larger number of services than an AE present in a field domain even if the AEs are identical or that the AEs use different services. AEs are divided (into a device AE, a gateway AE and a server AE) for the same reason.

An access control policy (ACP) entry may be a privilege.

Here, attributes of the subject entity may be limited to information included in a request.

Service Subscription Information Based Access Right Authentication

M2M Service Subscription Resource Type

An M2M service subscription (or service subscription profile) resource is determined according to which M2M service is used by an M2M subscriber (M2M application provider or M2M device (node/CSE) user) using M2M services (or M2M service roles) provided by an M2M service provider between the M2M service provider and the M2M subscriber.

An M2M service role is a subset of M2M services and can specify operations that can be used for each resource type. Alternatively, an M2M service role may specify operations that can be used for a specific resource type. In this case, an M2M service role used by an M2M subscriber is specified.

An M2M service subscription (or service subscription or M2M service subscription profile) resource specifies a subject entity, a target entity, resource types, and operations that can be executed by the subject entity for the resource types with respect to the target entity. That is, each M2M service subscription is assigned an M2M service subscription ID and includes subject entity attribute information (e.g. AE ID, AE domain (e.g. infrastructure domain/field domain or gateway AE/device AE/server AE), a node to which the corresponding subject entity belongs (e.g. in which the subject entity is installed) or CSE ID), target entity information (CSE ID or information (node ID or device ID) on a node or a device to which the corresponding CSE belongs, or all CSEs of the corresponding M2M service provider), and information on an M2M service (or service role) to which the subject entity subscribes. The M2M service information can specify operations that can be used for each resource type. From among the information included in the M2M service subscription, the target entity information may be omitted. In this case, the subject entity can be provided with the M2M service to which the subject entity subscribes for all nodes (i.e. all target entities).

The following table shows M2M services and M2M service roles mapped thereto.

TABLE 8

| M2M Service (name) | M2M-Serv-ID | Roles |
|---|---|---|
| Application and service management | 01 | 001-Software management |
| Device management | 02 | 002-Device Configuration |
|  |  | 003-Device Diagnostics and Monitoring |
|  |  | 004-Device Firmware Management |
|  |  | 005-Device Topology |
| Location | 03 | 006-Location |
| Data exchange | 04 | 007-Basic data |
| Device onboarding | 05 | 008-onboarding |
| Security | 06 | 009-Security Administration |

Using M2M service subscription through an M2M service provider domain is performed under an agreement of the corresponding M2M service provider. The following table shows M2M service roles and resource types/allowed operations mapped thereto. The following table is set by a service provider in order to allow validation of requests according to service subscription.

TABLE 9

| Service Role | Resource Type/Allowed Operations |
|---|---|
| 001: Software management | mgmtObj/CRUD |
|  | mgmtCmd/CRUD |
|  | software/CRUD |
| 002: Device Configuration | mgmtObj/CRUD |
|  | mgmtCmd/CRUD |
|  | deviceInfo/CRUD |
| 003: Device Diagnostics and Monitoring | mgmtObj/CRUD |
|  | mgmtCmd/CRUD |
|  | deviceInfo/CRUD |
|  | deviceCapability/CRUD |
| 004: Device Firmware Management | mgmtObj/CRUD |
|  | mgmtCmd/CRUD |
|  | firmware/CRUD |
| 005: Device Topology | mgmtObj/CRUD |
|  | mgmtCmd/CRUD |
|  | areaNwkInfo/CRUD |
|  | areaNwkDeviceInfo/CRUD |
| 006: Location | locationPolicy/CRUD |
|  | container/CRUD |
|  | subscription/CRUD |
| 007: Basic data | container/CRUD |
|  | subscription/CRUD |
| 008: onboarding | m2mServiceSubscription/CRUD |
|  | nodeInfo/CRUD |
| 009: Security Administration | accessControlPolicy/CRUD |

Specifically, M2M service subscription resources can include the following attributes.

TABLE 10

| Attributes of <m2mServiceSubscriptionProfile> | Multiplicity | RW/RO/WO | Description |
|---|---|---|---|
| resourceType | 1 | RO | Refer to Table 2 |
| resourceID | 1 | RO | Refer to Table 2 |
| parentID | 1 | RO | Refer to Table 2 |
| expirationTime | 1 | RW | Refer to Table 2 |
| accessControlPolicyIDs | 0 . . . 1 (L) | RW | Refer to Table 2 |
| creationTime | 1 | RW | Refer to Table 2 |
| labels | 0 . . . 1(L) | RW | Refer to Table 2 |
| lastModifiedTime | 1 | RO | Refer to Table 2 |
| serviceRoles | 0 . . . 1(L) | RW | This attribute contains a list of Service Role IDs (S-RoleIDs) that are subscribed to in this service subscription. If the multiplicity of this attribute is 0, the role does not apply. |

In the above table, a serverRoles attribute indicates the aforementioned information about a list of M2M service roles. In addition, the M2M service subscription resources have information about a node (authorizedNode) to which the M2M service subscription resources are applied as a child resource. The child resource can have the following attributes.

TABLE 11

| Attributes of <authorizedNode> | Multiplicity | RW/RO/WO | Description |
|---|---|---|---|
| resourceType | 1 | RO | Refer to Table 2 |
| resourceID | 1 | RO | Refer to Table 2 |
| parentID | 1 | RO | Refer to Table 2 |
| expirationTime | 1 | RW | Refer to Table 2 |
| accessControlPolicyIDs | 0 . . . 1 (L) | RW | Refer to Table 2 |
| creationTime | 1 | RO | Refer to Table 2 |
| Labels | 0 . . . 1 | RW | Refer to Table 2 |
| lastModifiedTime | 1 | RO | Refer to Table 2 |
| nodeID | 1 | WO | M2M-Node-ID of the node that is represented by this instance. |
| AE-IDs | 0 . . . 1 (L) | RW | List of AE-IDs representing the IDs of registered application on the node. This attribute is updated after AE registration or deregistration. |
| CSE-ID | 0 . . . 1 | WO | CSE-ID pertaining to this node (for nodes that have a CSE). |
| deviceIdentifier | 0 . . . 1 | WO | A list of device identifiers. A deviceIdentifier identifies a device using a Universally Unique IDentifier (UUID). The UUID specifies a valid, hexadecimal character string. The format of the URN is urn:uuid:########-####-####-############ OPS URN: Identifies a device using the format <OUI> "—" <ProductClass> "—" |

TABLE 11-continued

| Attributes of <authorizedNode> | Multiplicity | RW/ RO/ WO | Description |
|---|---|---|---|
| | | | <SerialNumber> as defined in Section 3.4.4 of TR-069 [i-4]. The format of the URN is urn:dev:ops:<OUI> "—" <ProductClass> "-" <SerialNumber>. OS URN: Identifies a device using the format <OUI> "—" <SerialNumber>. The format of the URN is urn:dev:os: <OUI> "—" <SerialNumber>. IMEI URN: Identifies a device using an International Mobile Equipment Identifier. The IMEI URN specifies a valid, 15 digit IMEI. The format of the URN is urn:mei:############## ESN URN: Identifies a device using an Electronic Serial Number. The ESN specifies a valid, 8 digit ESN. The format of the URN is urn:esn:######## MEID URN: Identifies a device using a Mobile Equipment Identifier. The MEID URN specifies a valid, 14 digit MEID. The format of the URN isurn:meid:############## |

Such M2M service subscription resources can be created/retrieved/updated/deleted by a specific AE (e.g. AE operated by the M2M service provider or manager AE) of the M2M system and may be automatically created in an M2M server (IN-CSE).

Association of M2M Service Subscription with AE ID (AE Registration)

Figure 8:
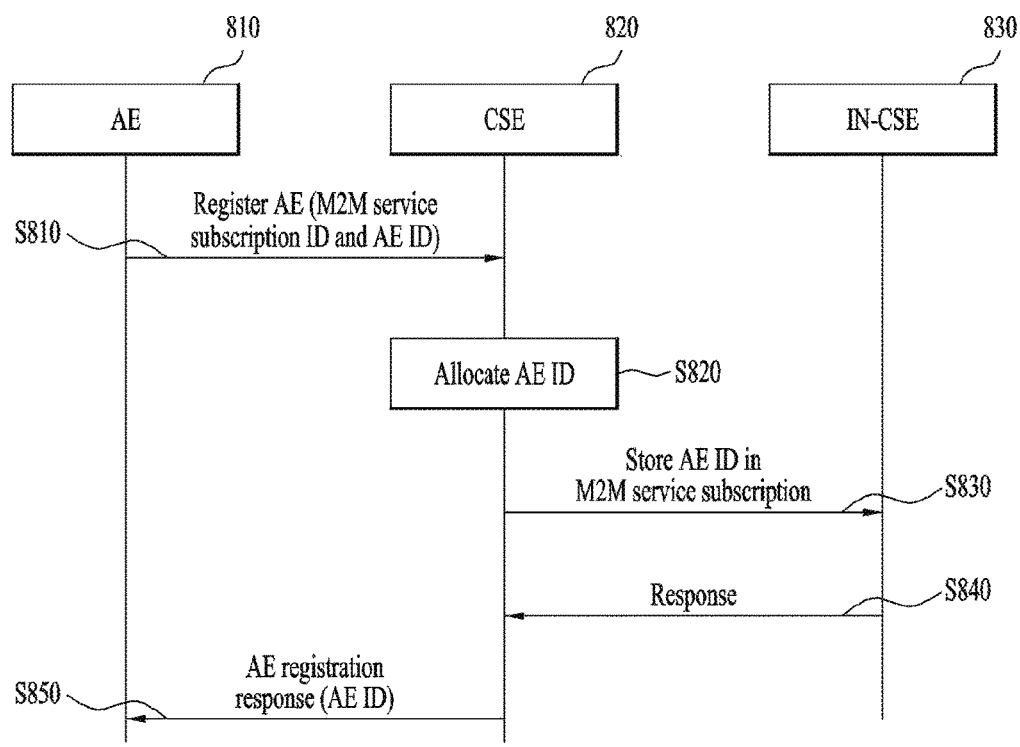
FIG. 8 illustrates a procedure for associating a specific identifier with a service subscription resource according to an embodiment of the present invention.

FIG. 8 illustrates an AE registration procedure.

In the AE registration procedure, an AE can provide an M2M service subscription ID. The M2M service subscription ID may be a URI indicating an M2M service subscription resource to which the AE belongs or information that can infer or identify the M2M service subscription resource. Here, the AE can also provide a preassigned AE ID.

The AE 810 may transmit an AE registration request to a CSE (AE registrar CSE) 820 (S810). The AE registration request includes the M2M service subscription ID and, when an AE ID for the CSE is preset, includes the AE ID. The AE registration request may include other information.

When the AE registration request does not include the AE ID, the CSE may allocate an AE ID (S820). When the AE registration request includes the AE ID, the CSE may determine whether to allocate the AE ID included in the AE registration request to the AE and then allocate the same AE ID as the aforementioned AE IE or a different AE ID to the AE.

The CSE stores the allocated AE ID in an M2M service subscription resource indicated by the M2M service subscription ID included in the AE registration request (S830). When the AE ID is prestored in the M2M service registration resource, the CSE does not store the AE ID. This step may be internally generated when the CSE belongs to the same node as an IN-CSE 830. The AE ID may be stored in association with information on a node/CSE to which the AE belongs (or which has the AE). In this case, the node information may be included in the request.

The IN-CSE 830 may provide a response to the CSE (S840). When the CSE corresponds to the IN-CSE, this step may be internally generated.

The CSE may send an AE registration response including the allocated AE ID to the AE (S850).

To discriminate an entity that updates M2M service roles from an entity that updates the AE IE when the AE ID is stored in the M2M service subscription resource, an access control policy of updating (adding/changing/deleting) the AE ID may differ from an access control policy of updating (adding/changing/deleting) the M2M service roles. One method is to individually allocate attributes and another method is to differentiate applied access control policies by differentiating resource levels.

M2M Service Subscription Verification

To check whether the M2M service subscription ID provided by the AE is an M2M service subscription ID actually allocated to the AE, credentials used by the AE may be associated with the M2M service subscription ID (or, additionally, the ID of the node to which the AE belongs). That is, when a security session is created on the basis of security information before AE registration by associating the ID of certificate information or security information such as a symmetric key, used by the AE, with the M2M service subscription ID, the registrar CSE or IN-CSE can verify whether the M2M service subscription ID (or, additionally, the ID of the node to which the AE belongs) associated with the security information used in the security session is the same as the M2M service subscription ID (or additionally the ID of the node to which the AE belongs) included in the AE registration request. When the two M2M service subscription IDs are identical, the aforementioned AE registration procedure has no problem. If the two M2M service subscription IDs differ from each other, the registrar CSE or IN-CSE can transmit an appropriate error response.

Alternatively, an identifier that can identify the AE may be present in addition to the AE ID. While the AE ID can be set during the AE registration procedure, the identifier that can identify the AE is valid prior to registration and thus the identifier is associated with the M2M service subscription ID. The identifier may be included in the AE registration request during the AE registration procedure and the registrar CSE or IN-CSE may verify whether the M2M service subscription ID associated with the identifier is the same as the M2M service subscription ID included in the AE registration request. When the two M2M service subscription IDs are identical, the aforementioned AE registration procedure has no problem. If the two M2M service subscription IDs differ from each other, the registrar CSE or IN-CSE can transmit an appropriate error response.

Registration Verification

Prior to registration of the AE ID to M2M service subscription, it is possible to check whether the AE ID can be registered through an M2M service role of M2M service subscription. Registration is possible if rights to create <AF> resource type (resource) are specified in an M2M service role of the corresponding M2M service subscription, whereas registration is impossible otherwise.

Association of M2M Service Subscription with Credentials

An AE or a node to which the AE belongs may have credentials used for security. The credentials may be associated with an M2M service subscription ID (and ID of the node to which the AE belongs).

Here, the credentials may be information shared between specific entities (between a subject entity and an intermediate entity or between the subject entity and a target entity) or information useful in an M2M system (between a subject entity and an intermediate entity, another intermediate entity or a target entity). For example, when a symmetric key is used as the credential information, a symmetric key ID (and the ID of a pair sharing the symmetric key) may be associated with the M2M service subscription ID (or additionally the ID of the node to which the AE belongs). If certificate information is used as the credential information, the name of the certificate information (or information that can uniquely identify the certificate information) may be associated with the M2M service subscription ID (or additionally the ID of the node to which the AE belongs). The AE and the credentials may be in a one-to-one relationship. Multiple AEs may have the same credentials in a multiple-to-one relationship.

In this case, referring to FIG. 8, the CSE 820 may derive the M2M service subscription ID (or additionally the ID of the node to which the AE belongs) through the credentials used for security association with the AE 810 and verify M2M service subscription for an operation requested by the subject entity through the M2M service subscription ID. The aforementioned security association has been accomplished prior to reception of the operation request/response.

The credentials may be a value provided by the M2M service provider and the credential information may be delivered in response to the AE registration request.

M2M Service Subscription Resource Acquisition Method

Service subscription resources instantiated as an M2M service subscription resource type may be stored in the IN-CSE (M2M server) and may not be stored in other CSEs. In this case, when access (operation) from the subject entity is generated in an ASN-CSE or an MN-CSE (access target CSE, access destination CSE or resource hosting CSE), that is, when a target entity of the access is an ASN-CSE, an MN-CSE or a node (device) of the ASN-CSE or MN-CASE, the ASN-CASE or MN-CSE can read the M2M service subscription resources from the IN-CSE and perform access control. Alternatively, an intermediate entity may read the M2M service subscription resources from the IN-CSE and perform access control.

In this case, the ASN-CSE or MN-CSE can maintain and use the read information since the M2M service role of the information, which has been subscribed once, is not changed.

While all service subscription resources are present in the IN-CSE, part thereof may be present in the ASN-CSE or MN-CSE. Here, part of the service subscription resources may be service subscription resources corresponding to the ASN-CSE or MN-CSE of the target or intermediate entity, which is specified in the service subscription resources (for example, when the service subscription resources refer to the CSE ID or node ID of the ASN-CSE or MN-CSE of the target or intermediate entity or to all CSEs/nodes.)

The MN-CSE and the ASN-CSE may be synchronized for the service subscription resources targeting the MN-CSE and the ASN-CSE (i.e. service subscription resources having the CSE IDs or node IDs of the MN-CSE and the ASN-CSE as target or intermediate entities or targeting all CSEs/nodes).

The ASN-CSE or the MN-CSE may read the service subscription resources from the IN-CSE or the IN-CSE may create/update the service subscription resources in the ASN-CSE or the MN-CSE. Alternatively, the ASN-CSE or the MN-CSE may subscribe to service subscription resources having the ASN-CSE or the MN-CSE as a target or intermediate entity, from among the aforementioned service subscription resources, and, when service subscription resources corresponding thereto are changed/created, may be notified of change/creation of the service subscription resources and store the changed/created service subscription resources. In this case, the service subscription resources stored in the ASN-CSE or the MN-CSE and service subscription resources corresponding to the node of the IN-CASE need to be synchronized to have the same values.

Here, the service subscription resources stored in the ASN-CSE/MN-CSE may not be shared with other entities.

The stored service subscription resources may be used for access control of an AE that accesses a node or a CSE of the node.

Access Control Mechanism #1

Figure 9:
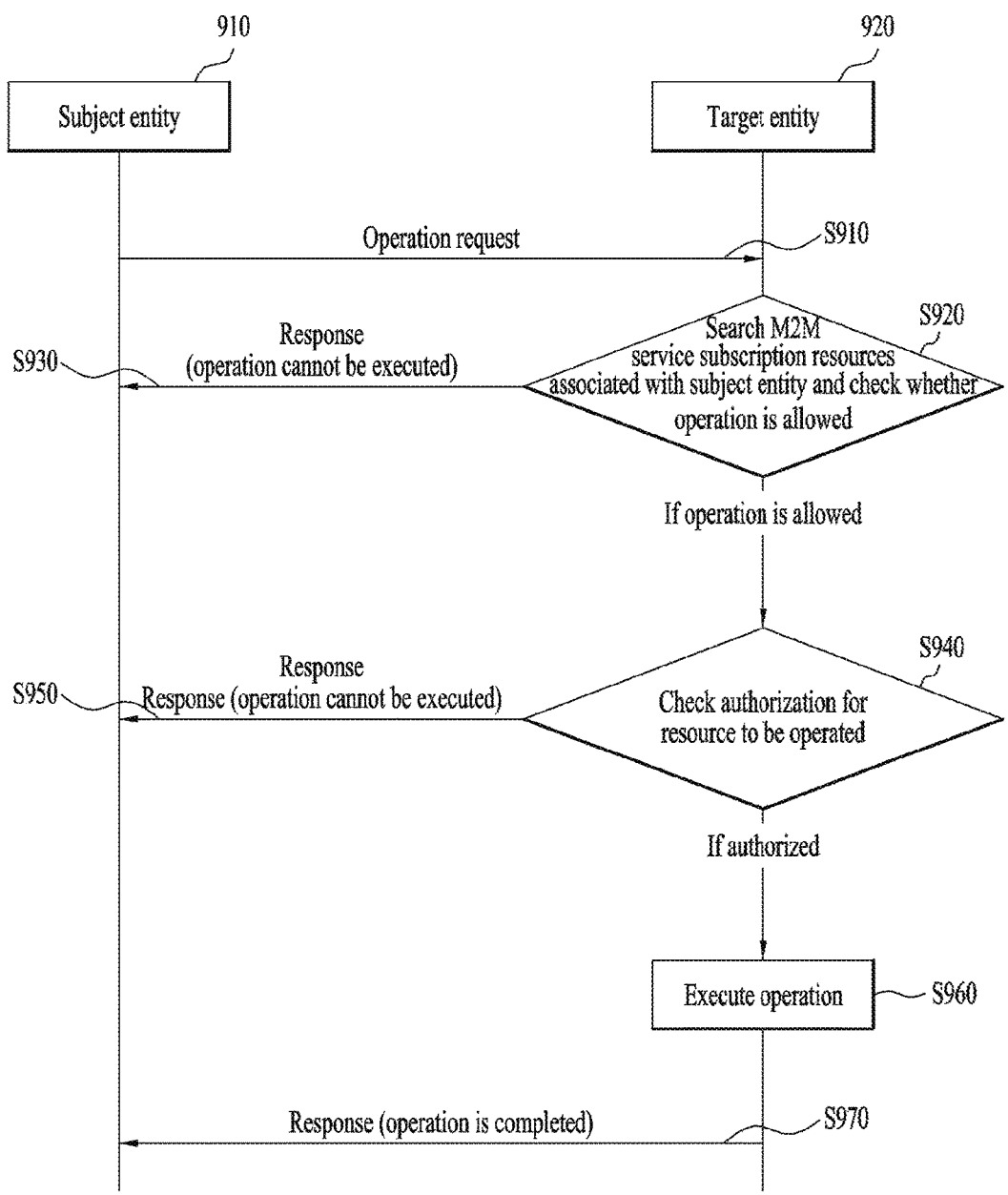
FIG. 9 illustrates a procedure for authenticating a resource operating request according to an embodiment of the present invention.

Access control for a resource manipulation request may be performed according to a method illustrated in FIG. 9.

Between a subject entity of a resource manipulation request and a target entity, another entity (i.e. intermediate entity) may be present. In this case, an access control policy (ACP) corresponding to resources conforming to (or having) <cseBase> resource type of the resource manipulation target entity may allow operation of creating resources for subject entities of all resource manipulation requests.

Here, the target entity may send a request for the following procedure performed by the target entity to another entity that determines access control. That is, the target entity may forward information on the aforementioned resource manipulation request such that the entity that determines access control performs steps S920 and S940 shown in FIG. 9 and sends the result to the target entity. Then, the target entity may manipulate the corresponding resources and/or transmit an appropriate response on the basis of the result of steps S920 and S940.

The subject entity 910 may send, to the target entity 920, a request for operating (creating/retrieving/updating/deleting/notifying) a resource of a specific resource type (S910). The manipulation request may include the AE/CSE ID of the subject entity. The manipulation request may include a token used for access control. The manipulation request may include an M2M service subscription ID. The resource type to be accessed according to the manipulation request may be determined through a part ("resource type" attribute) that specifies the resource type of the corresponding resource when the corresponding resource or an attribute (or a value therein) of the corresponding resource is accessed through an access address (URI or "to" parameter).

The target entity searches service subscription resources thereof for service subscription resources matched to the corresponding AE and checks whether the subject entity is authorized to operate the resource type requested in S910 (S920). A detailed procedure will be described later with reference to FIGS. 10 to 14.

When the subject entity is not authorized to operate the resource type, the target entity may notify the subject entity that resource manipulation is impossible (S930).

When the subject entity is authorized to operate the resource type, the target entity checks whether the subject entity is authorized to operate the resource requested in S910 (S940). A detailed procedure will be described later with reference to FIGS. 15 and 16.

When the subject entity is not authorized to operate the resource, the target entity may notify the subject entity that resource manipulation is impossible (S950). Then, the target entity may operate the resource requested in S910 (S960). Subsequently, the target entity may send a response to the resource manipulation request to the subject entity (S970).

In FIGS. 9, S920 and S930 may be interchanged with S940 and S950.

A detailed description will be given of S920 ("step of checking whether the subject entity is authorized to manipulate the resource type" or "M2M service subscription authentication") shown in FIG. 9.

Step S920 may be divided into the following processes according to information included in the manipulation request of S910. Step S920 is performed in the target entity of the manipulation request or an entity determining access control (referred to as a target entity or the like hereinafter).

When an App-ID allocated to a device/gateway is not used for the IN-AE, a process of determining a domain to which the corresponding AE belongs is omitted and only the App-ID may be considered.

Figure 10:
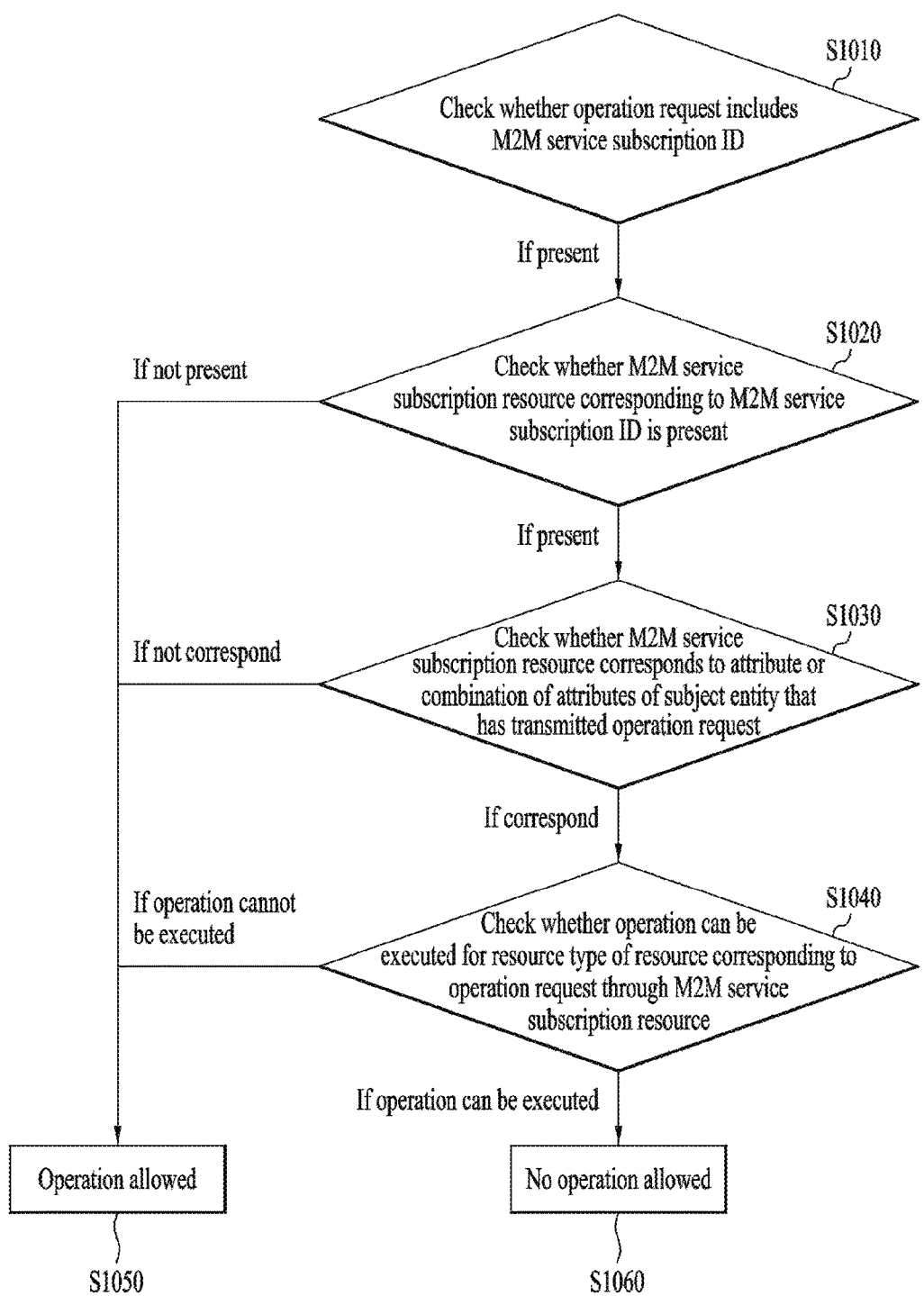
FIG. 10 illustrates a procedure for authenticating a specific resource type according to an embodiment of the present invention.

FIG. 10 illustrates the "step of checking whether the subject entity is authorized to manipulate the resource type" when the manipulation request includes an M2M service subscription ID.

The target entity or the like may check whether the manipulation request includes an M2M service subscription ID (or additionally the ID of the node to which the subject entity belongs) (S1010). When the M2M service subscription ID is included in the manipulation request, the target entity or the like may check whether an M2M service subscription resource corresponding to the M2M service subscription ID (or additionally the ID of the node to which the subject entity belongs) is present (S1020).

When the M2M service subscription resource is present, the target entity or the like may check whether the M2M service subscription resource corresponds to an attribute or a combination of attributes of the subject entity that has transmitted the manipulation request (S1030). Attributes or combinations of attributes of the subject entity and attributes of the target entity have been described. Step S1030 may be selectively performed and thus may be omitted.

It is possible to check whether the aforementioned operation can be executed for the resource type of the resource corresponding to the manipulation request through the M2M service subscription resource (S1040). Operation according to a specific resource type is specified in the M2M service subscription resource. In this case, the aforementioned operation can be executed for resources corresponding to the resource type.

Refer to Tables 8 and 9 for the operation of S1040. Operation according to a specific resource type is specified in the M2M service subscription resource. In this case, the aforementioned operation can be executed for resources corresponding to the resource type. More specifically, the target entity or the like searches M2M service roles of the M2M service subscription resource for at least one M2M service role specified for the resource type of the resource corresponding to the manipulation request and checks whether operations, which are specified in the M2M service role and allowed for the resource type of the resource corresponding to the manipulation request, include the aforementioned operation. If any M2M service role includes an allowed operation, the aforementioned operation can be executed.

The manipulation request is not allowed if any of S1020, S1030 and S1040 produces a negative result (S1050), whereas the manipulation request is allowed if all of S1020, S1030 and S1040 produce positive results (S1060).

Figure 11:
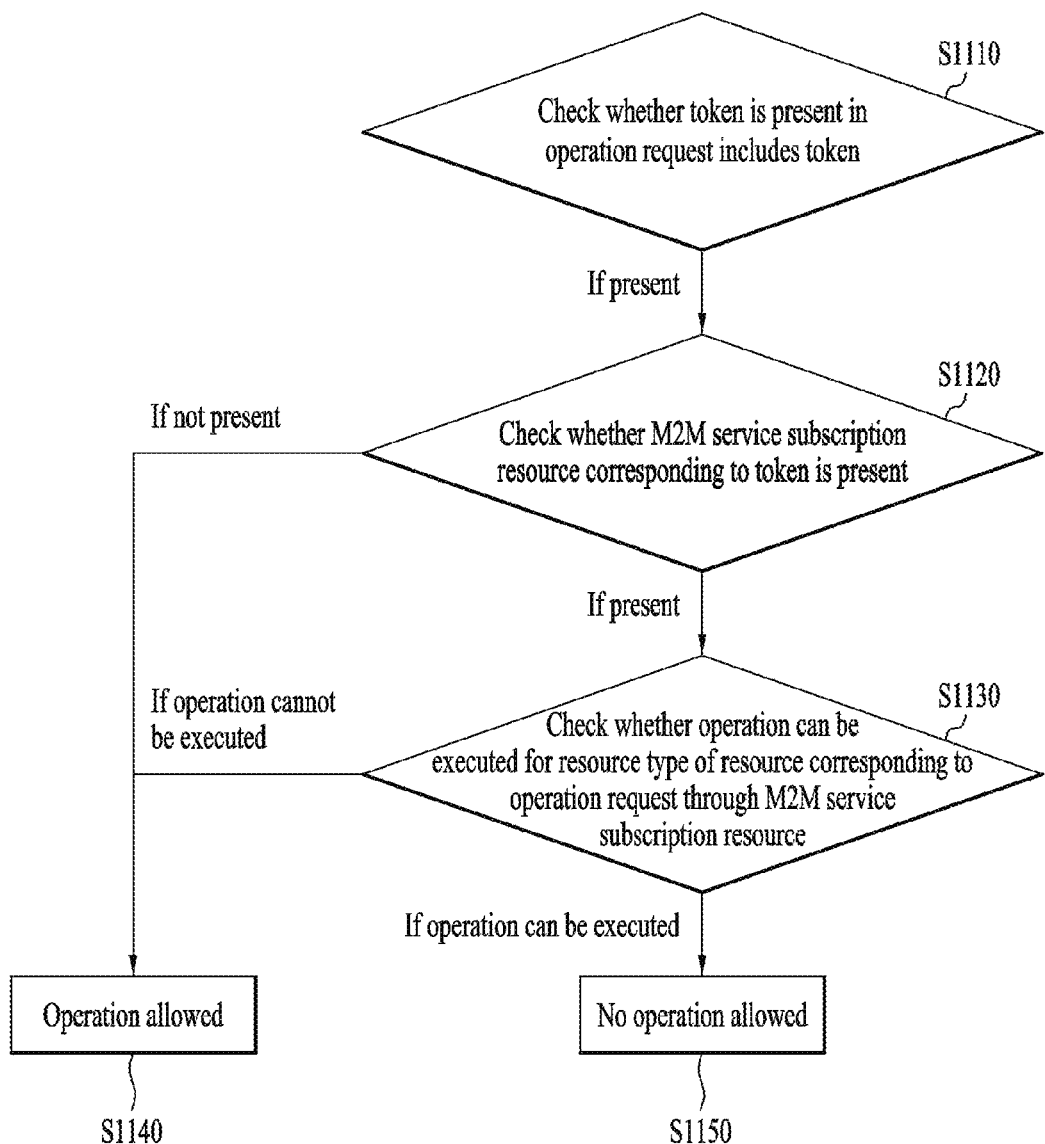
FIG. 11 illustrates a procedure for authenticating a specific resource type according to an embodiment of the present invention.

FIG. 11 illustrates the "step of checking whether the subject entity is authorized to manipulate the resource type" when the manipulation request includes a token.

The target entity or the like may check whether the manipulation request includes a token (S1110).

When the token is included in the manipulation request, the target entity or the like may check whether an M2M service subscription resource corresponding to the token is present (S1120).

The target entity or the like may check whether the aforementioned operation can be executed for the resource type of the resource corresponding to the manipulation request through the M2M service subscription resource (S1130).

Refer to Tables 8 and 9 for the operation of S1130. Operation according to a specific resource type is specified in the M2M service subscription resource. In this case, the aforementioned operation can be executed for resources corresponding to the resource type. More specifically, the target entity or the like searches M2M service roles of the M2M service subscription resource for at least one M2M service role specified for the resource type of the resource corresponding to the manipulation request and checks whether operations, which are specified in the M2M service role and allowed for the resource type of the resource corresponding to the manipulation request, include the aforementioned operation. If any M2M service role includes an allowed operation, the aforementioned operation can be executed.

The manipulation request is not allowed if any of S1120 and S1130 produces a negative result (S1140), whereas the manipulation request is allowed if all of S1120 and S1130 produce positive results (S1150). If one or more M2M service subscription resources are detected in S1120, the procedure moves to S1150 when S1130 has been performed on one of the M2M service subscription resources.

Figure 12:
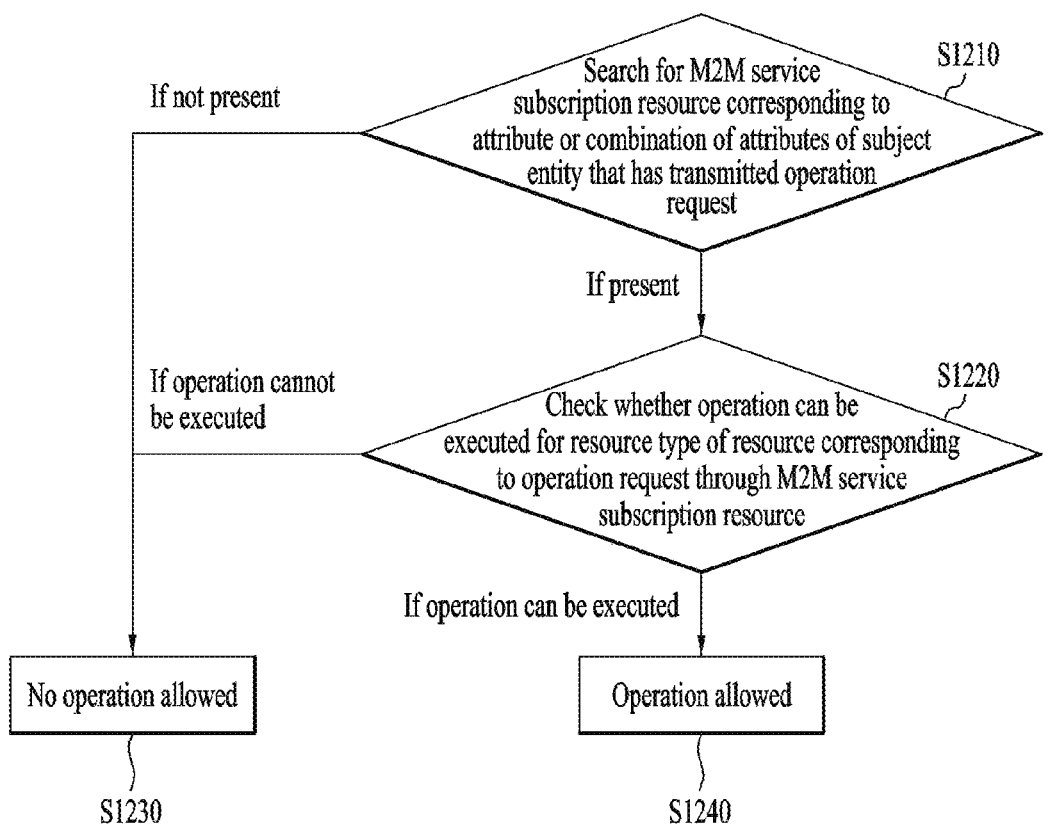
FIG. 12 illustrates a procedure for authenticating a specific resource type according to an embodiment of the present invention.

FIG. 12 illustrates the "step of checking whether the subject entity is authorized to manipulate the resource type" when the manipulation request does not include a token and an M2M service subscription ID.

The target entity or the like may search for an M2M service subscription resource corresponding to (or, additionally, applied to the target entity) an attribute or a combination of attributes of the subject entity that has transmitted the manipulation request (S1210).

When an M2M service subscription resource corresponding to an attribute of the subject entity is present, the target entity or the like may check whether the aforementioned operation can be executed for the resource type of the resource corresponding to the manipulation request through the M2M service subscription resource (S1220). Attributes or combinations of attributes of the subject entity and attributes of the target entity have been described.

Refer to Tables 8 and 9 for the operation of S1220. Operation according to a specific resource type is specified in the M2M service subscription resource. In this case, the aforementioned operation can be executed for resources corresponding to the resource type. More specifically, the target entity or the like searches M2M service roles of the M2M service subscription resource for at least one M2M service role specified for the resource type of the resource corresponding to the manipulation request and checks whether operations, which are specified in the M2M service role and allowed for the resource type of the resource corresponding to the manipulation request, include the aforementioned operation. If any M2M service role includes an allowed operation, the aforementioned operation can be executed.

The manipulation request is not allowed if any of S1210 and S1220 produces a negative result (S1230), whereas the manipulation request is allowed if all of S1210 and S1220 produce positive results (S1240). If one or more M2M service subscription resources are searched in S1210, the procedure moves to S1240 when S1220 has been performed on one of the M2M service subscription resources.

The procedure of FIG. 12 may be used when the manipulation request includes a token. In this case, the token is used only for resource authorization.

Accordingly, when the manipulation request includes the token, the procedures of FIGS. 11 and 12 can both be used. If the operation is allowed in any of the two procedures, M2M service subscription authentication is successfully performed.

Figure 13:
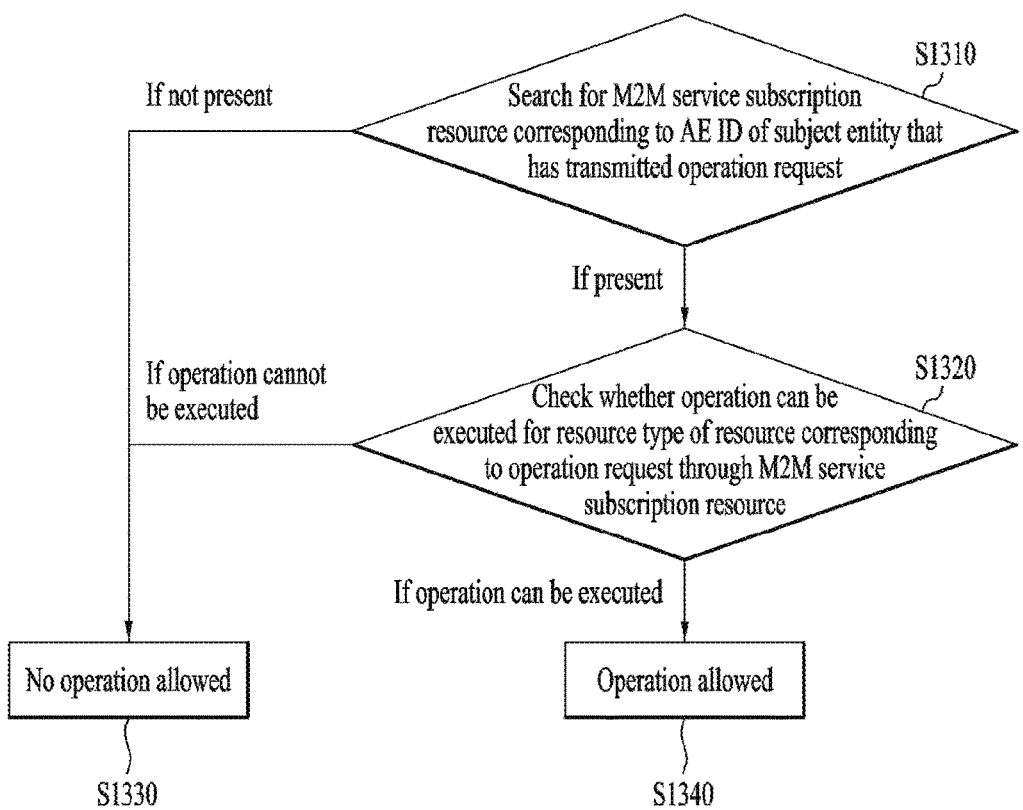
FIG. 13 illustrates a procedure for authenticating a specific resource type according to an embodiment of the present invention.

FIG. 13 illustrates the "step of checking whether the subject entity is authorized to manipulate the resource type" when the manipulation request includes an AE ID.

The target entity or the like may detect an M2M service subscription resource corresponding to the AE ID of the subject entity that has transmitted the manipulation request (S1310). An M2M service subscription resource may include AE ID information and thus a specific M2M service subscription resource can be detected through AE ID information.

The target entity or the like may check whether the aforementioned operation can be executed for the resource type of the resource corresponding to the manipulation request through the M2M service subscription resource (S1320).

Refer to Tables 8 and 9 for the operation of S1320. Operation according to a specific resource type is specified in the M2M service subscription resource. In this case, the aforementioned operation can be executed for resources corresponding to the resource type. More specifically, the target entity or the like searches M2M service roles of the M2M service subscription resource for at least one M2M service role specified for the resource type of the resource corresponding to the manipulation request and checks whether operations, which are specified in the M2M service role and allowed for the resource type of the resource corresponding to the manipulation request, include the aforementioned operation. If any M2M service role includes an allowed operation, the aforementioned operation can be executed.

The manipulation request is not allowed if any of S1310 and S1320 produces a negative result (S1330), whereas the manipulation request is allowed if all of S1310 and S1320 produce positive results (S1340). If one or more M2M service subscription resources are detected in S1310, the procedure moves to S1340 when S1320 has been performed on one of the M2M service subscription resources.

Figure 14:
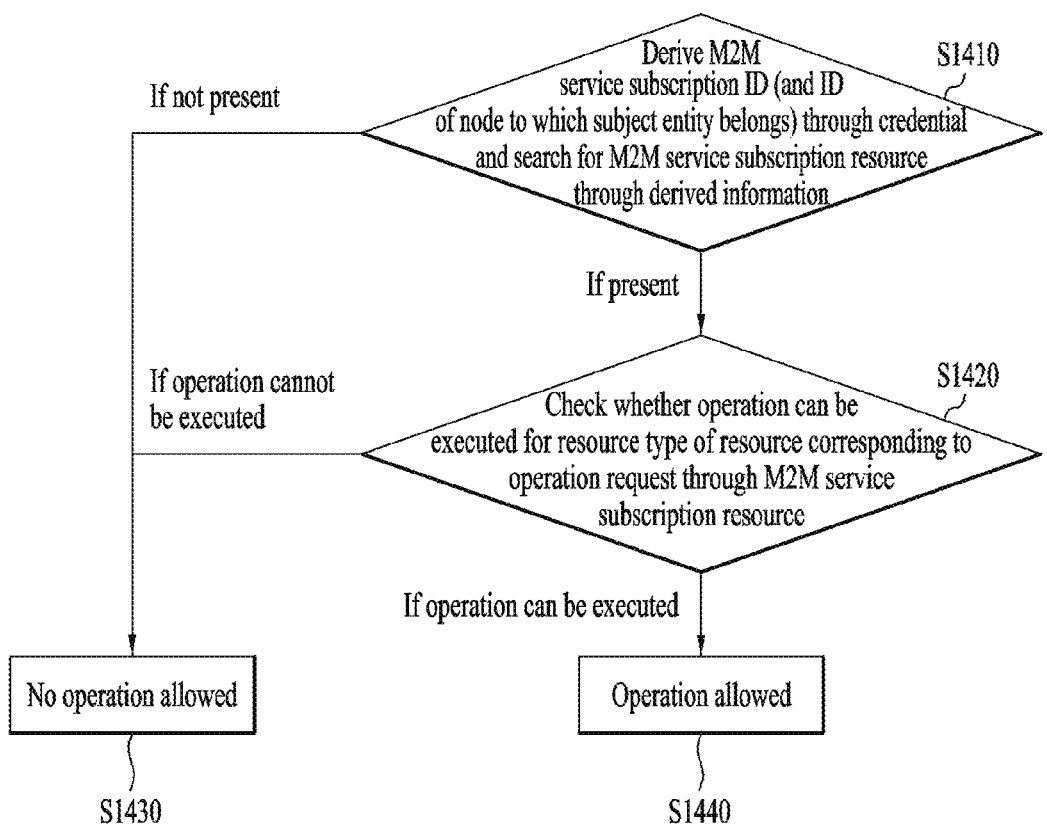
FIG. 14 illustrates a procedure for authenticating a specific resource type according to an embodiment of the present invention.

FIG. 14 illustrates the "step of checking whether the subject entity is authorized to manipulate the resource type" using credentials.

The target entity or the like may derive an M2M service subscription ID (or, additionally, the ID of the node to which the subject entity belongs) through credentials used for security association and detect an M2M service subscription resource through the derived information (S1410).

The target entity or the like may check whether the aforementioned operation can be executed for the resource type of the resource corresponding to the manipulation request through the M2M service subscription resource (S1420).

Refer to Tables 8 and 9 for the operation of S1420. Operation according to a specific resource type is specified in the M2M service subscription resource. In this case, the aforementioned operation can be executed for resources corresponding to the resource type. More specifically, the target entity or the like searches M2M service roles of the M2M service subscription resource for at least one M2M service role specified for the resource type of the resource corresponding to the manipulation request and checks whether operations, which are specified in the M2M service role and allowed for the resource type of the resource corresponding to the manipulation request, include the aforementioned operation. If any M2M service role includes an allowed operation, the aforementioned operation can be executed.

The manipulation request is not allowed if any of S1410 and S1420 produces a negative result (S1430), whereas the manipulation request is allowed if all of S1410 and S1420 produce positive results (S1440). If one or more M2M service subscription resources are detected in S1410, the procedure moves to S1440 when S1420 has been performed on one of the M2M service subscription resources.

A detailed description will be given of S940 ("step of checking whether the subject entity is authorized to operate the requested resource" or "actual resource authorization").

S920 of FIG. 9 checks whether the corresponding operation can be executed for the resource type of the resource that the subject entity intends to operate, that is, checks whether the subject entity has subscribed to the corresponding service from the M2M service provider, whereas S940 of FIG. 9 checks whether the subject entity is authorized for the corresponding resource.

Operation of S940 depends on information included in the manipulation request of S910.

Figure 15:
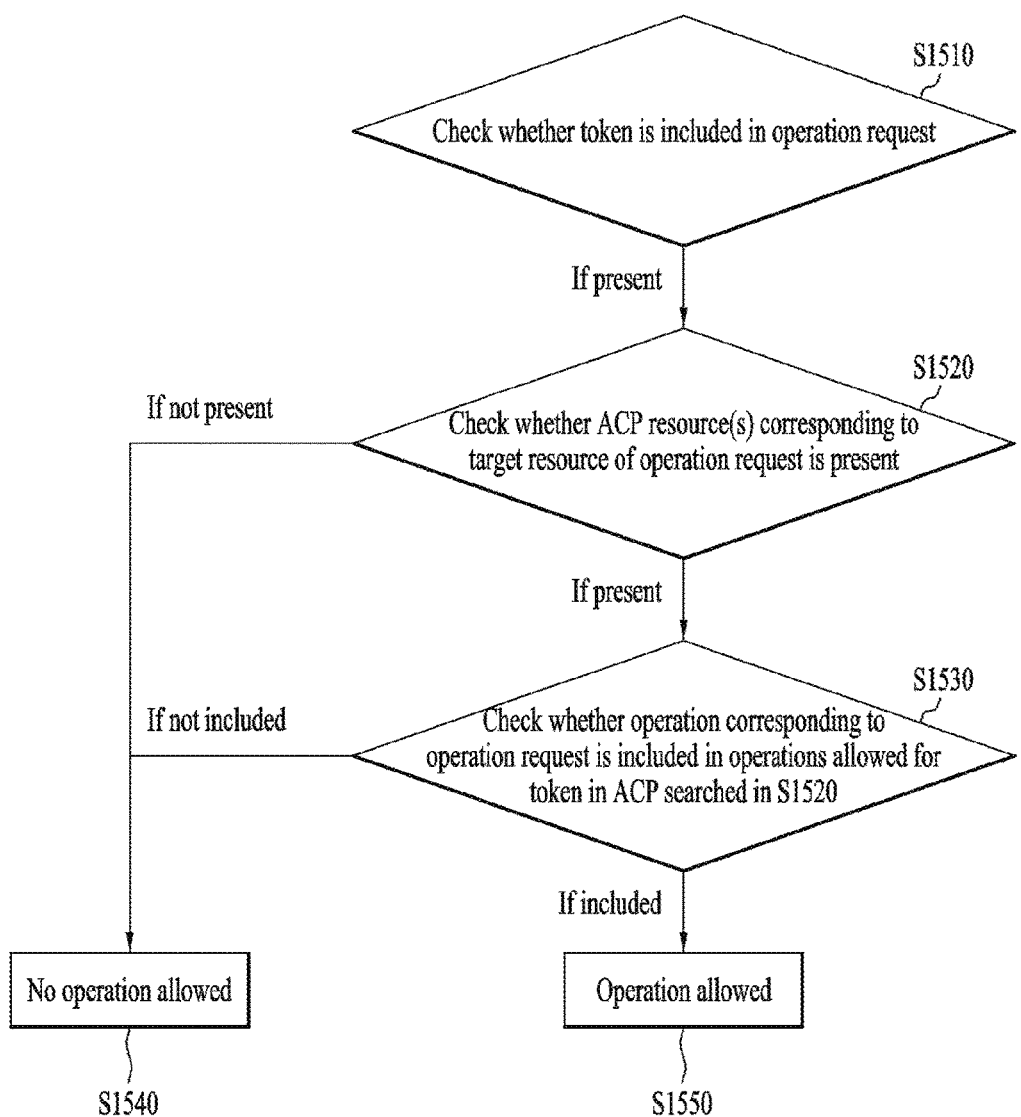
FIG. 15 illustrates a procedure for authenticating a specific resource type according to an embodiment of the present invention.

FIG. 15 illustrates the "step of checking whether the subject entity is authorized to operate the requested resource" when the manipulation request includes a token.

The target entity or the like may check whether the manipulation request includes a token (S1510).

The target entity or the like may check whether an access control policy (ACP) resource corresponding to the target resource of the manipulation request is present (S1520). The ACP resource may be indicated by a specific attribute of the target resource of the manipulation request.

The target entity or the like may check whether the operation (e.g. creation, retrieval, update, deletion or notification) corresponding to the manipulation request is included in operations allowed for the token in the ACP resource searched in S1520 (S1530).

The manipulation request is not allowed if any of S1520 and S1530 produces a negative result (S1540), whereas the manipulation request is allowed if both S1520 and S1530 produce positive results (S1550). If one or more ACP resources are searched in S1520, the procedure moves to S1550 when S1530 has been performed on one of the ACP resources.

The manipulation request may not be permitted even if the procedure is satisfied due to consideration of environment/context (e.g. time, date, IP address, etc.).

In addition, the manipulation request may be permitted in consideration of both the token and attributes of the subject entity by simultaneously performing S1530 and S1620 executed "when the manipulation request does not include a token", which will be described later.

Figure 16:
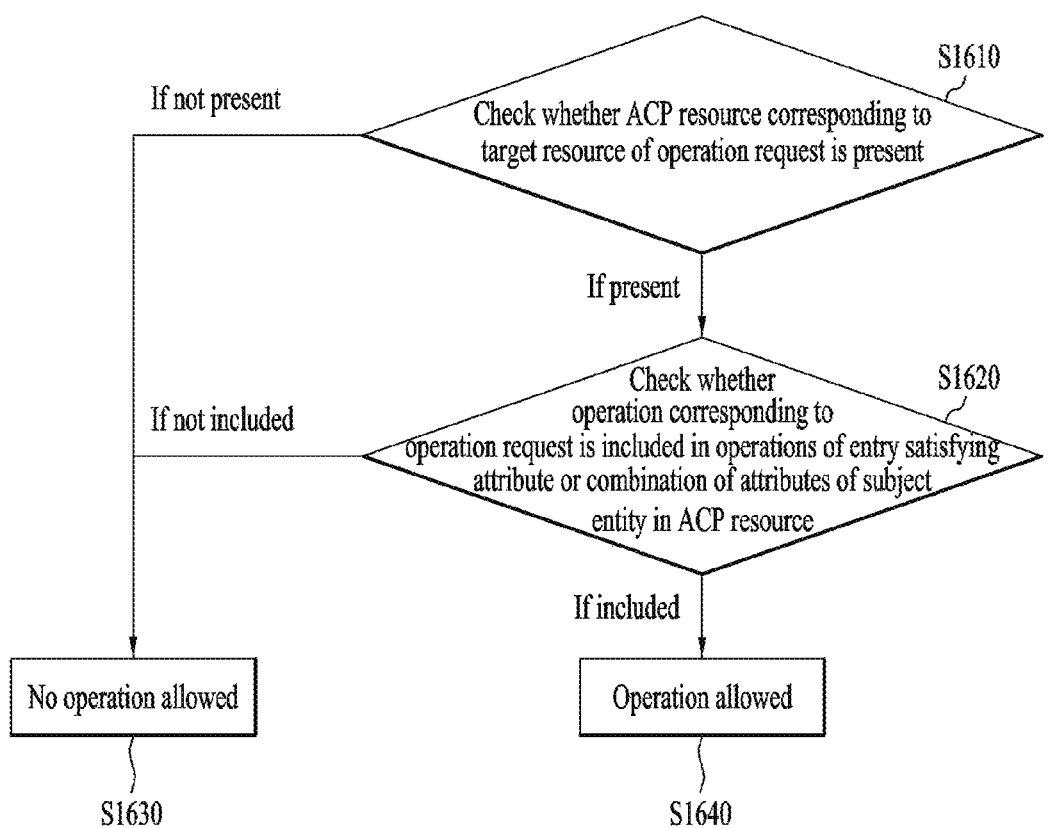
FIG. 16 illustrates a procedure for authenticating a specific resource type according to an embodiment of the present invention.

FIG. 16 illustrates the "step of checking whether the subject entity is authorized to operate the requested resource" when the manipulation request does not include a token.

The target entity or the like may check whether an access control policy (ACP) resource corresponding to the target resource of the manipulation request is present (S1610). The ACP resource may be indicated by a specific attribute of the target resource of the manipulation request.

The target entity or the like may check whether an entry that satisfies an attribute or a combination of attributes of the subject entity is present in the corresponding ACP resource and whether the operation corresponding to the manipulation request is included in operations specified by the entry (S1620). Contents about an attribute or a combination of attributes of the subject entity have been described.

The manipulation request is not allowed if any of S1610 and S1620 produces a negative result (S1630), whereas the manipulation request is allowed if both S1610 and S1620 produce positive results (S1640). If one or more ACP resources are searched in S1610, the procedure moves to S1640 when S1620 has been performed on one of the ACP resources.

The manipulation request may not be permitted even if the procedure is satisfied due to consideration of environment/context (e.g. time, date, IP address, etc.).

Access Control Mechanism #2

An access control mechanism according to another embodiment of the present invention applies M2M service subscription information to an ACP. M2M service subscription specifies a resource type and operations allowed for a specific subject entity with respect to a specific target entity. The access control mechanism applies M2M service subscription information to an ACP of a resource of the corresponding resource type of the specific target entity. However, manipulation rights in the ACP must not exceed those specified in M2M service subscription.

Figure 17:
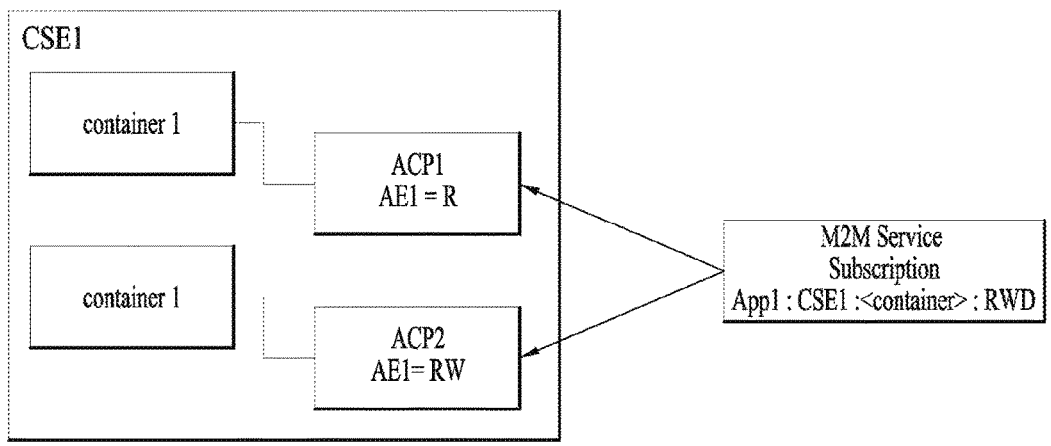
FIG. 17 illustrates a relationship between an access control policy resource and a service subscription resource according to an embodiment of the present invention.

Specifically, when App-ID of AE1 is App1 and M2M service subscription specifies that App1 can execute RWD (Read, Write, Delete) for <container> resource type of CSE1, as shown in FIG. 17, AE1 is prevented from having manipulation rights exceeding RWD by checking ACPs of all resources (container1 and container2) conforming to <container> resource type of CSE1. That is, ACP1 and ACP2 must not specify that AE1 and AE2 have rights for Create and Notify.

When authorization for operations (e.g. RWDN: Read, Write, Delete, Notify) exceeding those specified in M2M service subscription is requested for an ACP of a specific resource of a specific resource type, CSE1 can reject the request. Otherwise, CSE1 may delete operations other than operations allowed in the M2M service subscription from the requested operations and apply the resulting operations.

In addition, when M2M service subscription is changed, M2M service subscription information needs to be applied to all ACPs of resources having a resource type related to the changed M2M service subscription.

ACP rights may be restricted below the range of operations specified in M2M service subscription only for entities corresponding to attributes of the subject entity specified in the M2M service subscription.

Figure 18:
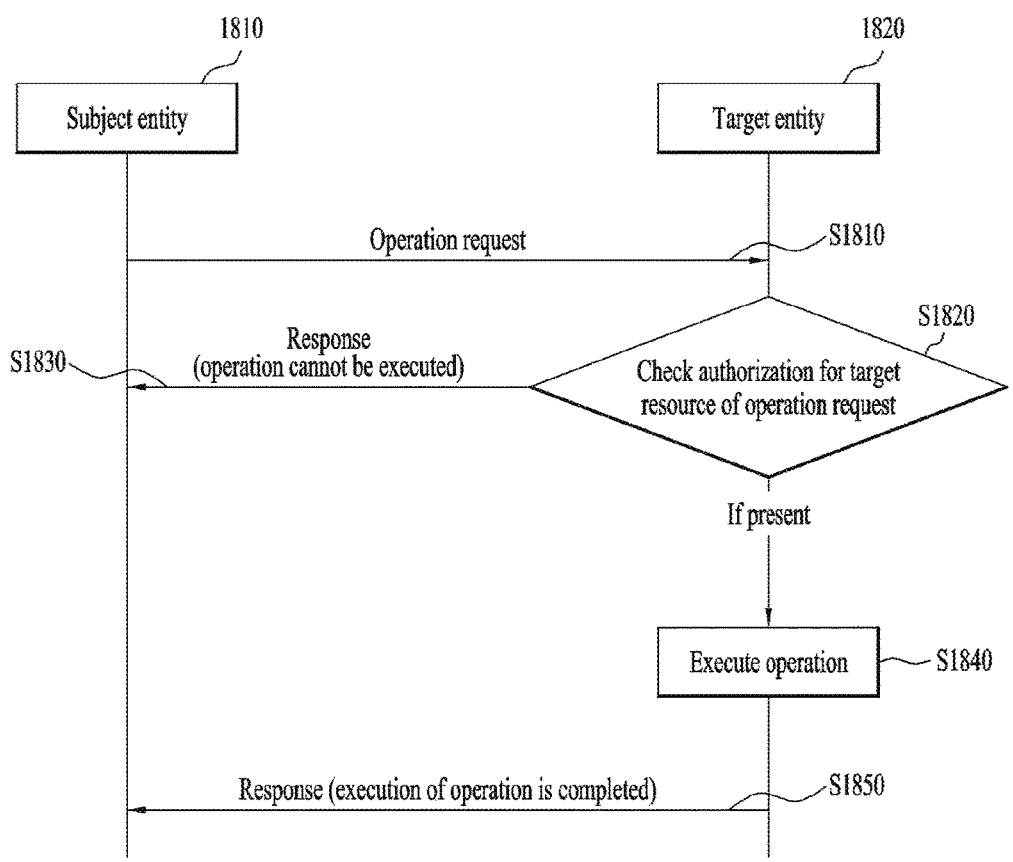
FIG. 18 illustrates a procedure for authenticating a resource operating request according to an embodiment of the present invention.

FIG. 18 illustrates an access control operation for a resource manipulation request according to an embodiment of the present invention.

A subject entity 1810 may send a request for operating (creating/retrieving/updating/deleting/notifying) a resource of a specific resource type (referred to as "manipulation request" hereinafter) to a specific resource hosting CSE, that is, a target entity (S1810). The manipulation request may include the AE/CSE ID of the subject entity. The manipulation request may include a token used for access control. In addition, the manipulation request may include an M2M service subscription ID.

The target entity S1820 may check whether the subject entity is authorized for the operation corresponding to the manipulation request (S1820).

More specifically, the target entity may search for an ACP corresponding to the resource that the subject entity intends to operate and check whether the ACP includes an entry that satisfies an attribute or a combination of attributes of the subject entity and whether the operation corresponding to the manipulation request is included in operations specified by the entry. Attributes or a combination of attributes of the subject entity have been described. When the manipulation request includes a token, the target entity may search the corresponding ACP for an entry corresponding to the token and, when the entry corresponding to the token is present, check whether the operation corresponding to the manipulation request is included in operations specified by the entry. When the token is used, the subject entity may be considered to be authorized for the operation if the operation corresponding to the manipulation request is included in operations specified by the entry corresponding to an attribute of the subject entity and the entry corresponding to the token.

If the operation corresponding to the manipulation request is not included in the operations specified by the entry, the target entity can notify the subject entity that the operation cannot be executed (S1830).

If the operation corresponding to the manipulation request is included in the operations specified by the entry, the target entity can excute the operation requested for the target resource of the manipulation request (S1840). Subsequently, the target entity can transmit a response to the manipulation request to the subject entity (S1850).

If one or more ACP resources are searched in S1820, the procedure moves to S1840 when S1820 has been performed on one of the ACP resources.

ACPs have a disadvantage that an ACP applied to a specific resource restricts manipulation rights such that an entity has the same rights for the same operation for all lower resources (in the case of Create or Delete) and attributes of the specific resource. Accordingly, when M2M service subscription is applied to an ACP, the M2M service subscription cannot be applied to resources that have not yet been created/present although the M2M service subscription can be applied to current resources. Therefore, the target entity checks whether rights to create a specific resource are present for the resource type of the specific resource through M2M service subscription without checking the ACP when creating the specific resource. In this case, whether the specific resource can be created may be specified in the M2M service subscription.

Create rights authentication will now be described with reference to FIGS. 19 and 20.

Figure 19:
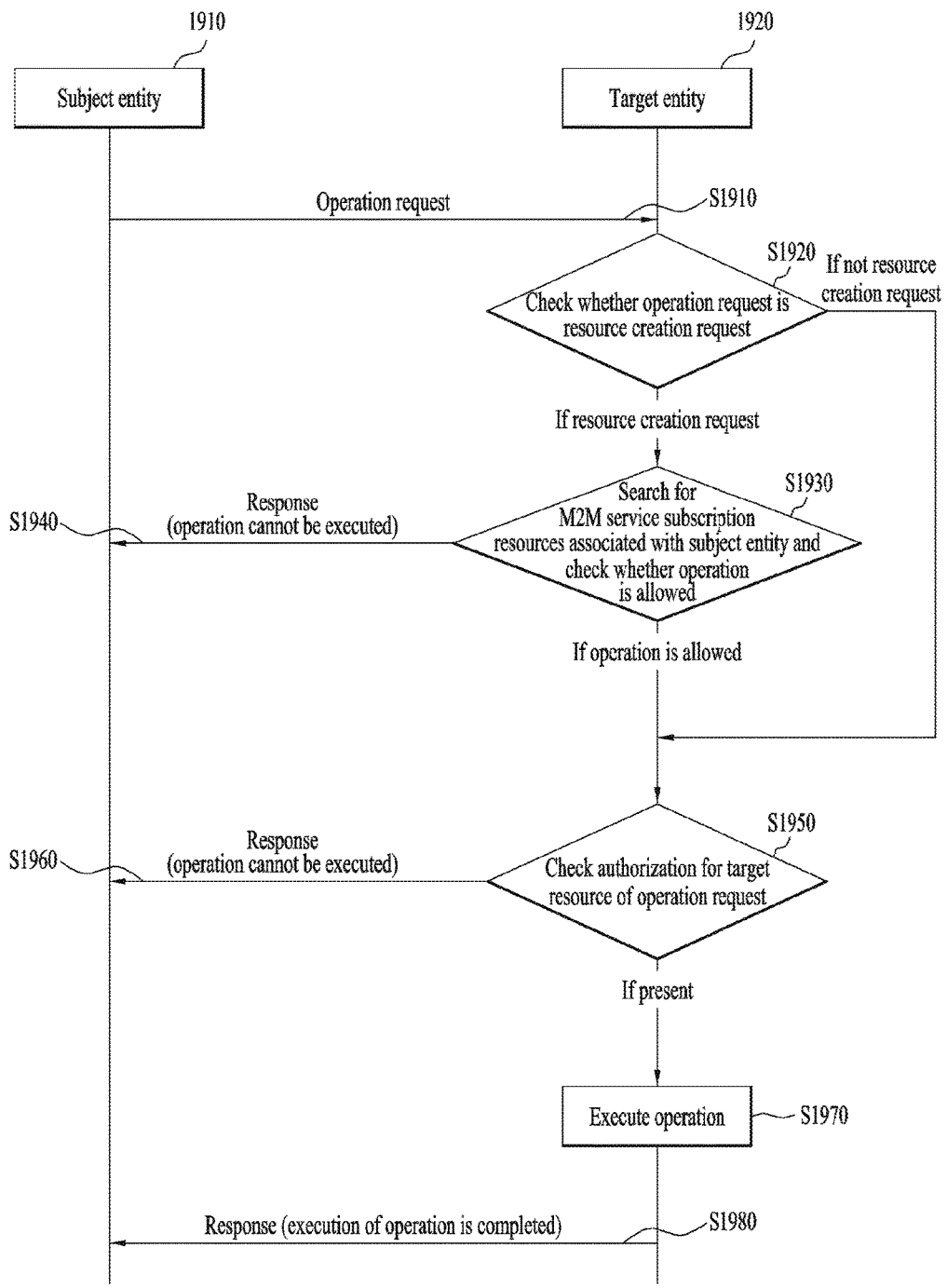
FIG. 19 illustrates a procedure for authenticating a resource operating request according to an embodiment of the present invention.

FIG. 19 illustrates a procedure of authenticating a create operation request according to an embodiment of the present invention.

A subject entity 1910 may send a request (referred to as a manipulation request hereinafter) for operating (creating/retrieving/updating/deleting/notifying) a resource of a specific resource type to a specific resource hosting CSE, that is, a target entity 1920 (S1910). The manipulation request may include the AE ID of the subject entity. The manipulation request may include a token used for access control. In addition, the manipulation request may include an M2M service subscription ID.

The target entity may check whether the manipulation request corresponds to an operation for creating a resource (S1920).

If the manipulation request corresponds to an operation for creating a resource, the target entity may search M2M service subscription resources for a service subscription resource corresponding to the subject entity and check whether the subject entity is authorized to operate the target resource type of the manipulation request (S1930). Refer to the above description with reference to FIGS. 10 to 14 for details of S1930.

When the subject entity is not authorized to operate the target resource type of the manipulation request, the target entity may notify the subject entity that the resource cannot be created (S1940).

When the subject entity is authorized to operate the target resource type of the manipulation request or the manipulation request is not a request for creating the resource, the target entity may check whether the subject entity is authorized to operate the target resource of the manipulation request (S1950). Refer to the above description with reference to FIGS. 15 and 16 for details of S1950.

When the subject entity is not authorized to operate the resource corresponding to the manipulation request, the target entity may notify the subject entity that the corresponding operation cannot be executed (S1960).

When the subject entity is authorized to operate the resource corresponding to the manipulation request, the target entity may execute the operation corresponding to the manipulation request (S1970). Subsequently, the target entity may send a response to the manipulation request to the subject entity (S1980).

The aforementioned procedure can be equally applied to a delete operation. Information on authorization for creating a specific resource type may be specified in a resource other than the M2M service subscription resource. In this case, the target entity may check the corresponding resource and check whether the subject entity is authorized to create the specific resource type.

Figure 20:
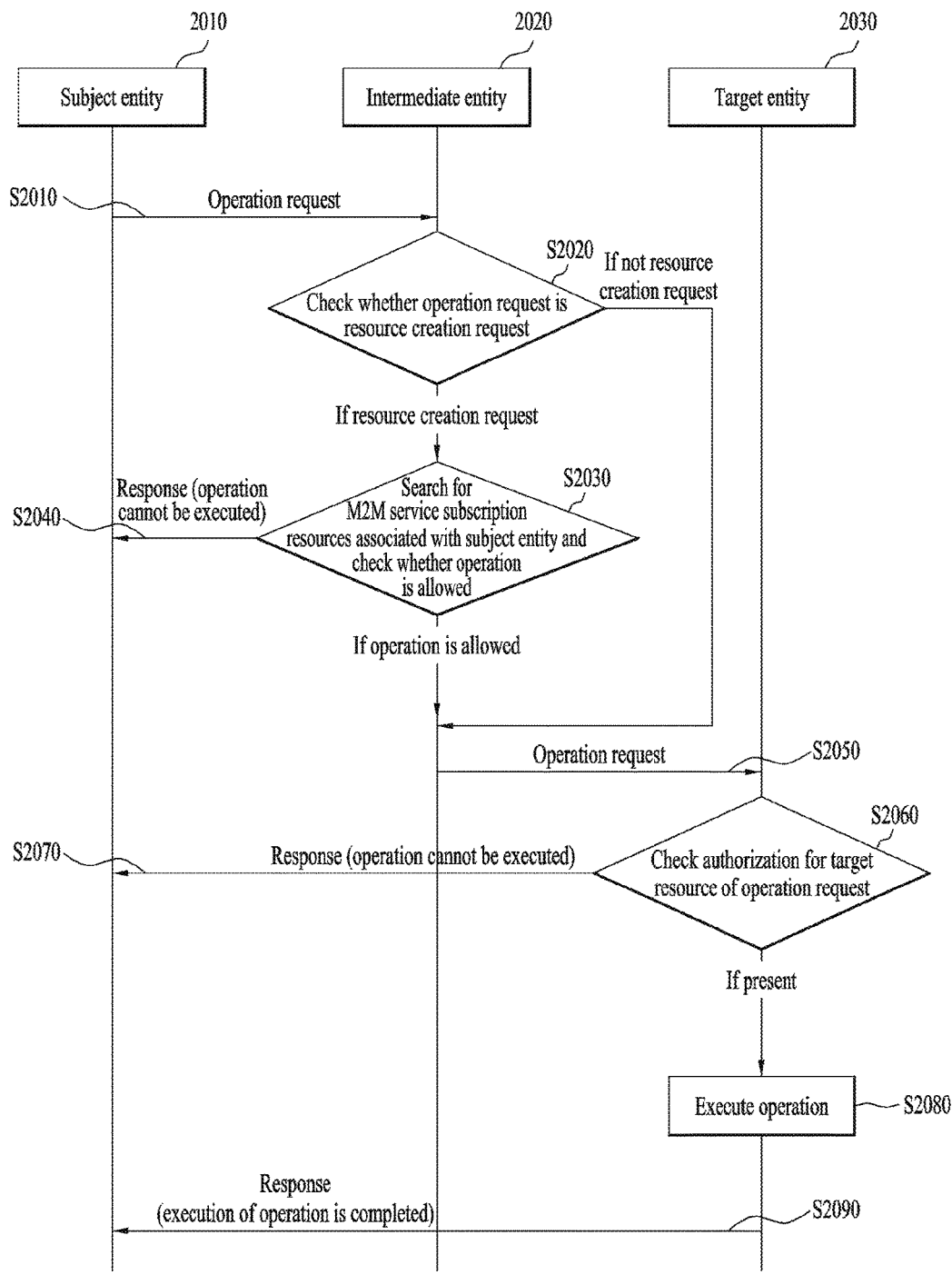
FIG. 20 illustrates a procedure for authenticating a resource operating request according to an embodiment of the present invention.

FIG. 20 illustrates a procedure of authenticating a create operation request according to an embodiment of the present invention. In the present embodiment illustrated in FIG. 20, an intermediate entity authenticates rights for the target resource type of the operation request through an M2M service subscription resource.

A subject entity 2010 may send a request (referred to as a manipulation request hereinafter) for operating (creating/retrieving/updating/deleting/notifying) a resource of a specific resource type to a specific resource hosting CSE, that is, an intermediate entity 2020 (S2010). The manipulation request may include the AE ID of the subject entity. The manipulation request may include a token used for access control. In addition, the manipulation request may include an M2M service subscription ID.

The intermediate entity may check whether the manipulation request corresponds to an operation for creating a resource (S2020).

If the manipulation request corresponds to an operation for creating a resource, the intermediate entity may search M2M service subscription resources for a service subscription resource corresponding to the subject entity and check whether the subject entity is authorized to operate the target resource type of the manipulation request (S2030). Refer to the above description with reference to FIGS. 10 to 14 for details of S2030.

When the subject entity is not authorized to operate the target resource type of the manipulation request, the intermediate entity may notify the subject entity that the resource cannot be created (S2040).

When the subject entity is authorized to operate the target resource type of the manipulation request or the manipulation request is not a request for creating the resource, the intermediate entity may transfer the manipulation request to a target entity 2030 (S2050).

The target entity may check whether the subject entity is authorized to operate the target resource of the manipulation request (S2060). Refer to the above description with reference to FIGS. 15 and 16 for details of S2060.

When the subject entity is not authorized to operate the resource corresponding to the manipulation request, the target entity may notify the subject entity that the corresponding operation cannot be executed (S2070).

When the subject entity is authorized to operate the resource corresponding to the manipulation request, the target entity may execute the requested operation (S2080). Subsequently, the target entity may send a response to the manipulation request to the subject entity (S2090).

The intermediate entity may be in a registration relationship with the subject entity. In addition, the intermediate entity and the target entity may be identical. Furthermore, information on the rights to create a specific resource type may be specified in a resource other than the M2M service subscription resource. In this case, it is possible to check the corresponding resource and check whether the subject entity is authorized to create the specific resource type.

In the case of a certain resource type, even if the resource type is authorized, appropriate access control may not be secured. A case in which the resource type provides multiple functions is an example. In this case, it is necessary to divide the resource type into functions and to authorize the resource type. Accordingly, in the case of a certain resource type (e.g. mgmtObj and mgmtCmd), combinations of the resource type and function identifiers (e.g. mgmtDefinition) are authorized. M2M service subscription lists manipulation rights available for the combinations of the resource type and the function identifiers. During access control, access control can be performed by checking the corresponding resource type and function identifier.

Even if M2M service subscription is used, it is necessary to determine whether rights for resources are substantially present through an ACP. While such mechanism is valid when there are multiple resources of a specific resource type, the specific resource type needs to be set both for the M2M service subscription and the ACP when one (multiplicity: 1) or zero (multiplicity: 0 or 1) resources of the specific resource type are present. Accordingly, an embodiment of the present invention proposes an M2M service role applicable to all resources of a specific resource type of M2M service subscription through the M2M service subscription.

Such proposed scheme may be restricted through multiplicity of definition of resource types. For example, the scheme cannot be used for a resource type having multiplicity of greater than 1.

The above proposed scheme is applied to the access control mechanisms illustrated in FIGS. 9 and 18.

The following step is added between S910 and S920 of FIG. 9.

The target entity searches for an M2M service subscription resource related to the manipulation request, checks whether the M2M service subscription resource has an M2M service role authorized for all resources corresponding to the target resource type of the manipulation request and then checks whether the M2M service role includes the operation corresponding to the manipulation request. When the M2M service role includes the operation corresponding to the manipulation request, the procedure moves to S960. When the M2M service role does not include the requested operation, the procedure moves to S920

With respect to the access control mechanism illustrated in FIG. 18, the target entity may check whether M2M service subscription applied thereto has an M2M service role authorized for all resources. When the M2M service role is present, the target entity includes, in ACPs of all resources of the resource type of the M2M service role provided therein, subject entity attributes specified in an M2M service subscription resource to which the M2M service role belongs and operations allowed for the M2M service role. That is, in the case of the M2M service role applied to actual resources in the M2M service subscription, related content is applied to the corresponding ACP.

In the above description with reference to FIGS. 8 to 20, "AE", "CSE", "subject entity", "intermediate entity" and "target entity" and operations associated therewith may be understood or explained as operations executed by nodes (e.g., ADN, ASN, MN and IN) in which the entities are installed or resident. In addition, the nodes may be called M2M devices, M2M gateways or M2M servers, as described above.

Figure 21:
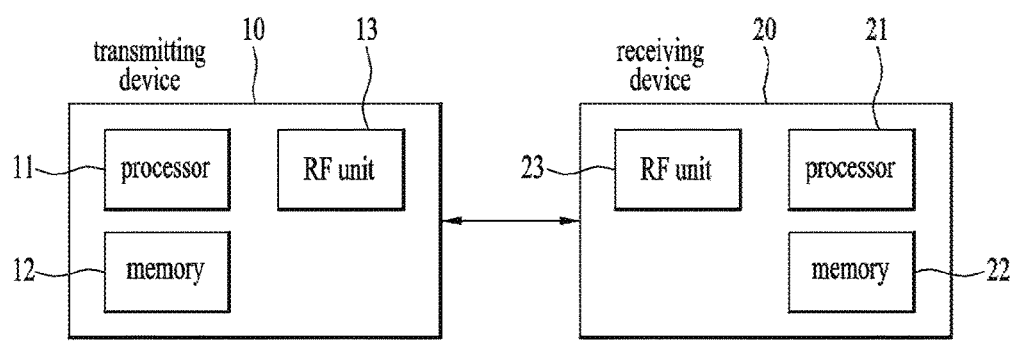
FIG. 21 is a block diagram of an apparatus for implementing embodiments of the present invention.

FIG. 21 is a block diagram of a transmitting device 10 and a receiving device 20 configured to implement exemplary embodiments of the present invention. Referring to FIG. 21, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

What is claimed is:

1. A method of authorizing, by an M2M device, a request for a specific operation of a first resource in a wireless communication system, comprising:

identifying an M2M service subscription resource of a requesting M2M device using a credential of the requesting M2M device;

receiving a registration request from the requesting M2M device;

allocating an identifier of the requesting M2M device when the registration request does not include the identifier of the requesting M2M device;

transmitting, to an M2M server, an inclusion request for including the identifier of the requesting M2M device, included in the registration request, or the allocated identifier of the requesting M2M device into the identified M2M service subscription resource;

receiving, from the requesting M2M device, an operation request for the specific operation of the first resource, wherein the operation request includes the identifier of the requesting M2M device, the identifier being associated with the identified M2M service subscription resource;

searching the identified M2M service subscription resource using the identifier, and determining whether the requesting M2M device is authorized for a type of the first resource using the M2M service subscription resource;

determining whether the requesting M2M device is authorized for the specific operation of the first resource, by using an access control policy resource for the first resource, when the requesting M2M device is determined to be authorized for the type of the first resource; and executing the specific operation of the first resource when the requesting M2M device is determined to be authorized for the specific operation of the first resource.

2. The method according to claim 1, wherein the determining of whether the requesting M2M device is authorized for the type of the first resource comprises determining that the requesting M2M device is authorized for the type of the first resource, when a plurality of M2M service subscription resources are searched and the requesting M2M device is determined to be authorized for the type of the first resource using one of the plurality of M2M service subscription resources.

3. The method according to claim 1, wherein the access control policy resource for the first resource is indicated by a predetermined attribute of the first resource.

4. The method according to claim 1, wherein the M2M service subscription resource includes IDs of service roles subscribed to the M2M service subscription resource and has a child resource storing identifiers of nodes or devices to which the M2M service subscription resource is applied.

5. An M2M device configured to authorize a request for a specific operation of a first resource in a wireless communication system, comprising:
a receiver and a transmitter; and
a processor device that controls the receiver and the transmitter, wherein the processor device:
identifies an M2M service subscription resource of a requesting M2M device using a credential of the requesting M2M device,
controls the receiver to receive a registration request from the requesting M2M device,
allocates an identifier of the requesting M2M device when the registration request does not include the identifier of the requesting M2M device,
controls the transmitter to transmit, to an M2M server, an inclusion request for including the identifier of the requesting M2M device, included in the registration request, or the allocated identifier of the requesting M2M device into the identified M2M service subscription resource,
controls the receiver to receive, from the requesting M2M device, a request for the specific operation of the first resource, wherein the operation request includes the identifier of the requesting M2M device, the identifier is associated with the identified M2M service subscription resource;
searches the identified M2M service subscription resource using the identifier and determine whether the requesting M2M device is authorized for a type of the first resource using the M2M service subscription resource;
determines whether the requesting M2M device is authorized for the specific operation of the first resource, by using an access control policy resource for the first resource, when the requesting M2M device is determined to be authorized for the type of the first resource; and
executes the specific operation of the first resource when the requesting M2M device is determined to be authorized for the specific operation of the first resource.

6. The M2M device according to claim 5, wherein the processor is configured to determine that the requesting M2M device is authorized for the type of the first resource, when a plurality of M2M service subscription resources are searched and the requesting M2M device is determined to be authorized for the type of the first resource using one of the plurality of M2M service subscription resources.

7. The M2M device according to claim 5, wherein the access control policy resource for the first resource is indicated by a predetermined attribute of the first resource.

8. The M2M device according to claim 5, wherein the M2M service subscription resource includes IDs of service roles subscribed to the M2M service subscription resource and has a child resource storing identifiers of nodes or devices to which the M2M service subscription resource is applied.

* * * * *